United States Patent
Dinnocenzo et al.

(10) Patent No.: US 7,022,392 B2
(45) Date of Patent: *Apr. 4, 2006

(54) IN-SITU POLYMERIZED MATRIX FOR ISOMERIZED OPTICAL RECORDING ARTICLE

(75) Inventors: Joseph P. Dinnocenzo, Penfield, NY (US); Douglas R. Robello, Webster, NY (US); Samir Y. Farid, Rochester, NY (US); Mark R. Mis, Hornell, NY (US); Lorraine Ferrar, Fairport, NY (US); Aaron S. Peer, Milpitas, CA (US); Thomas G. Brown, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 10/700,873

(22) Filed: Nov. 4, 2003

(65) Prior Publication Data
US 2005/0095390 A1    May 5, 2005

(51) Int. Cl.
*B32B 3/02* (2006.01)

(52) U.S. Cl. ............... 428/64.1; 428/64.8; 430/270.12
(58) Field of Classification Search ............... 428/64.1, 428/64.4, 64.8; 430/270.12, 495.1
See application file for complete search history.

(56) References Cited

U.S. PATENT DOCUMENTS

| | | | |
|---|---|---|---|
| 5,759,721 A | 6/1998 | Dhal et al. | |
| 5,874,187 A | 2/1999 | Colvin et al. | |
| 6,103,454 A | 8/2000 | Dhar et al. | |
| 6,165,648 A | 12/2000 | Colvin et al. | |
| 6,512,606 B1 | 1/2003 | Lipson et al. | |
| 6,569,600 B1 * | 5/2003 | Dinnocenzo et al. | .. 430/270.15 |

FOREIGN PATENT DOCUMENTS

JP    2000-086588    3/2000

* cited by examiner

*Primary Examiner*—Elizabeth Mulvaney
(74) *Attorney, Agent, or Firm*—Paul A. Leipold

(57) ABSTRACT

An optically recorded article comprising a pattern of isomerized material in two isomeric forms in a matrix, wherein one of the isomeric forms is capable of being converted to the other form by one-electron oxidation and wherein said matrix was polymerized in-situ.

56 Claims, No Drawings

US 7,022,392 B2

IN-SITU POLYMERIZED MATRIX FOR ISOMERIZED OPTICAL RECORDING ARTICLE

FIELD OF THE INVENTION

This invention relates to an optical recording element that is capable of storing and retrieving information.

BACKGROUND OF THE INVENTION

The modern information revolution has led to an ever-increasing demand for data storage systems. As a case in point, CD and DVD disks represent successful high volume data storage technologies. One major advantage of these technologies is that reading or writing of data is accomplished by shining light on the disk so there is no physical contact between the media and the optical head. However, the total storage capacity of these disks is limited by the size of the smallest marks on the surface of the media that can be read by the wavelength of light employed. Many attempts have been made to develop data storage systems with progressively smaller marks. However, the required equipment is prohibitively expensive, and the data access rates tend to be unacceptably slow.

One way to increase the storage capacity of a medium is to record the information depthwise, rather than just on the surface. Suitable techniques for depthwise recording include holography, two-photon optics, and similar methods for illuminating media in three dimensions, with the goal of producing marks in three dimensions, and thereby providing very high data capacity systems.

Photoreactions (e.g., bleaching or photochromicity) of organic dyes have also been used as a means to record optical data, both in a single layer in writeable CD-type media, and depthwise (dissolved in a bulk piece of polymer). However, a large amount of optical power is required in these systems to produce readable marks and therefore the rate of recording with such media is slow. Many photochromic systems tend to fade over time.

Holographic recording has also been achieved by optically induced birefringence in suitable polymers, a process that relies on photo-alignment of the side chains within the polymers. Once again, a large amount of optical power is required, and this process is inefficient and slow. In addition, the fidelity of the recorded information may degrade with time since optically induced orientation tends to relax over time in polymers.

JP 2000-086588 discloses a recording medium using changes in circular dichroism based on the interconversion of chiral norbornadiene and quadricyclane derivatives. However, this technique requires enantiomerically enriched compounds that are difficult to synthesize. Furthermore, this application does not disclose the use of recording sensitizers for photoinduced electron transfer.

U.S. Pat. No. 5,759,721 discloses a holographic recording medium that uses a photopolymerization technique suitable for recording information optically in three dimensions.

There is a problem with this process, however, in that photopolymerization is usually accompanied by shrinkage of the material that is a consequence of the process of forming new chemical bonds among the constituents. Any dimensional changes that occur in the medium on writing a hologram by photopolymerization limit the resolution that can be achieved, and reduce the data capacity of the medium. In addition, photopolymerization generally requires the use of low molecular weight reactants so that media made from these materials tend to be undesirably soft or sticky. Furthermore, the most common method of photopolymerization, free radical polymerization, is subject to interference by atmospheric oxygen that causes undesirable inconsistencies in the process. Furthermore, because photopolymerization is used for forming the physical medium, for subsequent optical recording, and finally for fixing the image, much of the available dynamic range of the material is not available for data recording.

Colvin, et al., U.S. Pat. Nos. 5,874,187; 6,165,648; and 6,512,606 disclose a recording medium in which the matrix is polymerized in situ from an oligomer and monomer combination, but the same monomer is consumed for matrix formation and for recording, thus limiting the dynamic range. Dhar et al., U.S. Pat. No. 6,103,454, disclose a recording medium in which the matrix precursor and the photoactive monomer used for recording polymerize by independent reactions. However, their system does not avoid the polymerization-induced shrinkage common to such materials.

U.S. Pat. No. 6,512,606-Lipson et al. discloses an optical data storage system and method comprising a photopolymer medium having a generally polymerizable monomer, an active binder, a first hologram recording polymerization initiator, and a second data recording polymerization initiator. The monomer is preferably cationic ring-opening monomer.

U.S. Pat. No. 6,103,454-Dhar et al. discloses a photo recording medium formed by mixing a matrix precursor and a photoactive monomer, and curing the mixture to form the matrix in situ. The reaction by which the matrix precursor is polymerized during the cure is independent from the reaction by which the photoactive monomer is polymerized during writing of data.

PROBLEM TO BE SOLVED BY THE INVENTION

There is a need for optical data storage of increased capacity. Further there is a need to provide technology for fabricating the physical medium independently of the optical recording system.

SUMMARY OF THE INVENTION

It is an object of the invention to overcome disadvantages of prior materials and processes.

It is a further object to provide optical recording material with increased storage capacity.

These and other objects of the invention are generally accomplished by an optically recorded article comprising a pattern of isomerized material in two isomeric forms in an in-situ polymerized matrix.

DETAILED DESCRIPTION OF THE INVENTION

The invention has numerous advantages. The invention provides for a matrix (binder) to be formed in situ by polymerization, that is, polymerization in the presence of the reactant and recording sensitizer to produce the optical recording element as a solid solution. The matrix may be a linear, branched, or cross-linked polymer. Any materials may be used in forming the matrix of the invention provided they dissolve the reactant and recording sensitizer and do not interfere with the chemical transformation of the reactant that comprises the optical recording process. In general, the matrix should be optically transparent in the spectral region where the recording sensitizer absorbs, i.e., should not have significant absorption at the excitation wavelength for optical recording. Furthermore, the oxidation potential of the polymerized matrix must be sufficiently high so as not to suppress the subsequent desired optical recording chemistry. The matrix may also contain compounds commonly used to improve the quality of a polymer matrix, for example, a plasticizer, and a preservative. These and other advantages will be apparent from the detailed description below.

It is an object of this invention to increase the storage capacity of an optical recording material. It is another object of this invention to provide an optical recording material that can record information depthwise, rather than just on the surface. It is still another object of this invention to provide an optical recording material that does not substantially change dimensions upon recording. It is yet another object of this invention to provide a process for fabricating an optical recording medium of sufficient thickness so that the potential advantages of depthwise recording can be realized. Furthermore, it is another object of this invention to provide a technology for fabricating the physical medium independently of the optical recording system, so that all of the available dynamic range is conserved, and none is expended in fabricating the medium. It is another object of this invention to provide an optical recorded medium suitable for the distribution of pre-recorded information.

These and other objects are achieved in accordance with the invention which comprises an optical recording material which when exposed to actinic radiation produces a change in optical properties in the exposed regions, thereby providing a pattern of intelligence for storing and retrieving information, the recording material comprising:

a) a reactant that is capable of undergoing an isomerization reaction upon one electron oxidation, thus causing the change in optical properties in the exposed regions;

b) a recording sensitizer that is capable of absorbing actinic radiation to cause an initial one electron oxidation of the reactant.

c) a matrix that is formed by the in situ polymerization of a suitable monomer or mixture of monomers by the action of an initiator, independent of the process used to create the abovementioned pattern of intelligence that employs the reactant and recording sensitizer.

In accordance with the invention, an optical recording material is obtained which possesses several advantages over the prior art.

1. The invention involves a photoinitiated reaction in a solid polymer that creates changes in the optical properties of the material. However, because the invention relies on photoisomerization rather than photopolymerization, the dimensional changes accompanying recording are negligible. (No new bonds are formed between molecules.)

2. The invention involves a recording process that can be efficient in the use of light. In preferred embodiments, the process involves a photoinitiated chain reaction; thus, many new molecules can be formed per photon absorbed (chemical amplification). A relatively large change in optical properties can be obtained with only a small exposure to the recording beam.

3. The material of the invention is a simple, stable polymer, which can be conveniently fabricated into films and slabs.

4. The optical changes in the material of the invention are large, permanent, localized, and can easily be detected; thus forming the basis for an optical storage medium. The invention is especially suited to three dimensional optical data recording systems such as holography and two-photon optics.

5. Unlike free radical polymerization, cation radical rearrangements of the invention are not sensitive to molecular oxygen, and will not be subject to the inconsistent performance that is commonly observed for free radical photopolymerizations that are currently used in the art.

6. The fabrication technology of in situ polymerization allows for the production of arbitrarily thick samples of optical recording media, suitable for high capacity three-dimensional data storage.

7. The fabrication technology of in situ polymerization can be carried out at conveniently low temperatures (below 100° C.).

Definitions

Recording sensitizer: A light absorbing compound used to induce the imaging reaction. Upon (image-wise) photo-excitation, the recording sensitizer leads to one-electron oxidation of the reactant.

Reactant: A compound that upon one-electron oxidation is converted to an isomeric product.

Product: An isomer of the reactant, formed subsequently to the one-electron oxidation of the reactant, and differing from the reactant in one or more physical properties, e.g., refractive index.

Photoinitiator Dye: A light absorbing compound used in combination with the activator to initiate in situ polymerization to form the matrix. Upon (blanket) exposure, the excited photoinitiator dye reacts with the activator, leading to formation of a free radical that initiates polymerization of the matrix precursor. The photoinitiator dye is chosen to absorb at a substantially longer wavelength than the recording sensitizer, reactant, and product, and to undergo significant photobleaching at the excitation wavelength used for imaging (the wavelength absorbed by the recording sensitizer).

Activator: An N-oxyazinium compound that accepts an electron from an excited photoinitiator dye, a process that leads to fragmentation of the activator to give a free radical that initiates polymerization of the matrix precursor.

Photoinitiator System: The combination of photoinitiator dye and activator for in-situ photopolymerization of the matrix precursor.

Thermal Initiator: A compound that undergoes thermal fragmentation to generate free radicals that initiate polymerization of the matrix precursor.

Matrix precursor: A composition of one or several compounds that can be polymerized photochemically or thermally to form the matrix that binds the recording sensitizer and reactant (and ultimately after image recording, the product), as well as any optional ingredients.

Matrix: The polymerized composition derived from the matrix precursor that binds the recording sensitizer and reactant (and ultimately after image recording, the product), as well as any optional ingredients.

In-situ polymerization: The process of converting the matrix precursor to the matrix by polymerization in the presence of the recording sensitizer and reactant, as well as any optional ingredients.

Matrix by Vinyl Free Radical Polymerization

Suitable matrices of the invention include those produced by in-situ polymerization of matrix precursors selected from ethylenically unsaturated monomers such as styrene or its derivatives; acrylic or methacrylic esters such as ethyl acrylate, methyl methacrylate, butyl acrylate, cyclohexyl methacrylate, acrylic or methacrylic amides such as methyl methacrylamide, t-butyl acrylamide, isopropyl acrylamide. acrylonitrile; maleic anhydride; N-alkylmaleimides or N-arylmaleimides, vinyl ethers; vinyl esters such as vinyl acetate; vinyl halides. Matrix forming monomers may be used singly or in combination (i.e., copolymerization). Any of the monomeric or crosslinkable polymeric film forming components disclosed in Jenkins et al and Heseltine et al U.S. Pat. No. Re. 27,925 or Re. 27, 922, respectively, are suitable for use in the matrices of this invention. Tan et al U.S. Pat. No. 4,289,842, discloses matrices comprising acrylate copolymers containing pendant groups, such as alkenyl groups with ethylenic unsaturation. Lindley U.S. Pat. No. 4,590,147, discloses vinyl oligomers which can be employed as matrices in this invention. Useful matrix forming components containing vinyl monomers are disclosed in Fuerniss U.S. Pat. No. 4,497,889 and Anderson et al U.S. Pat. No. 4,535,052. Kosar "Light-Sensitive Systems," John Wiley & Sons, 1965, further describes a variety of useful film forming components for use in the practice of this invention, including ethylenically unsaturated monomers and polymers. Preferably, the monomer or monomers are liquids before polymerization to facilitate fabrication.

In preferred embodiments, monomers with more than one ethylenically unsaturated moiety can be employed, leading to cross linked matrices. Crosslinked media are preferred because of improved stability. Monomers leading to cross linked matrices include divinylbenzene, ethylene glycol dimethacrylate, trimethylolpropane triacrylate, pentaerithritol tetraacrylate.

Thermal Free Radical Initiators:

To polymerize ethylenically unsaturated monomer systems, small amounts of conventional thermal free radical initiators such as peroxides or azo compounds can be employed. Warming the solution of monomer(s), free radical initiator, reactant, and recording sensitizer forms the matrix in situ, thereby incorporating the reactant, and recording sensitizer in a solid solution that constitutes the optical recording element. Suitable thermal free radical initiators include 2,2'-azobisisobutyronitrile (AIBN), 2,2'-azobis(2-methylbutyronitrile), 4,4'-azobis(4-cyanopentanoic acid, 2,2'-azobis(2,4-dimethylvaleronitrile, benzoyl peroxide (BPO), 1,1-azobis(cyclohexanecarbonitrile).

Photochemical Free Radical Initiators:

In an alternative procedure, the free radical initiator can be photochemically rather than thermally activated. In this case, the photochemical initiator system must be carefully selected to avoid interference with the subsequently formed optical recording element. Specifically, the photochemical initiator system must absorb a significantly longer wavelength of light than the recording sensitizer of the optical recording element to avoid premature exposure of the recording element. Also, after formation of the binder by in situ polymerization, the residual photochemical initiator system must have negligible absorbance at the wavelength of absorption of the recording sensitizer of the optical recording element to prevent undesirable decreases in sensitivity caused by competition for the light used to perform recording. Moreover, the components of the photochemical initiator system must be chosen so as not to suppress the subsequent optical recording element, that is, the oxidation potential of the residual photochemical initiator system must be sufficiently high so as not to interfere with the recording chemistry.

Persons skilled in the art of photopolymerization will recognize that the above requirements are not easily met by most conventional systems. However, photopolymerization initiatior systems based on certain photoinitiator dyes plus activators (N-oxyazinium compounds) may be employed in this invention to advantage.

Photoinitiator Dyes

In the scope of the invention, the photoinitiator dye is any dye that by reaction with an N-oxyazinium activator leads to the formation of an oxyradical, which initiates polymerization of the binding medium and causes bleaching of the photoinitiator dye.

The photoinitiator dyes useful in the invention can be for example, cyanine dyes, complex cyanine dyes, merocyanine dyes, complex merocyanine dyes, homopolar cyanine dyes, styryl dyes, oxonol dyes, hemioxonol dyes, and hemicyanine dyes, squarilium dyes, coumarin dyes, rhodamine dyes, acridine dyes, oxanol dyes. Representative photoinitiator dyes are discussed in *Research Disclosure*, Item 36544, September 1996, the disclosure of which, including the disclosure of references cited therein are incorporated herein by reference. These dyes may be synthesized by those skilled in the art according to the procedures described herein or F. M. Hamer, *The Cyanine Dyes and Related Compounds* (Interscience Publishers, New York, 1964).

Photoinitiator cyanine or merocyanine dyes can be represented by the general formulae F-1 to F-5 below:

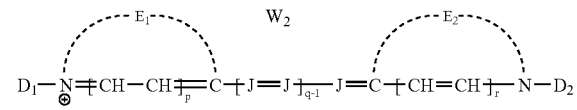

F-1 wherein:

$E_1$ and $E_2$ represent the atoms necessary to form a substituted or unsubstituted hetero ring and may be the same or different, each J independently represents a methine group, q is a positive integer of from 1 to 4, p and r each independently represents 0 or 1, $D_1$ and $D_2$ each independently represents alkyl or aryl groups, and $W_2$ is a counterion as necessary to balance the charge;

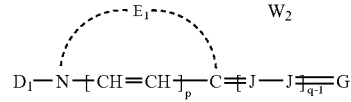

F-2 wherein $E_1$, $D_1$, J, p, q and $W_2$ are as defined above for formula F-1 and G represents

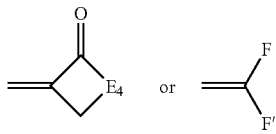

wherein $E_4$ represents the atoms necessary to complete a substituted or unsubstituted heterocyclic nucleus, and F and F' each independently represents a cyano group, an ester group, an acyl group, a carbamoyl group or an alkylsulfonyl group;

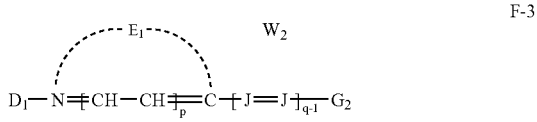

F-3 wherein $D_1$, $E_1$, J, p, q and $W_2$ are as defined above for formula F-1, and $G_2$ represents an amino group or a substituted or unsubstituted aryl group;

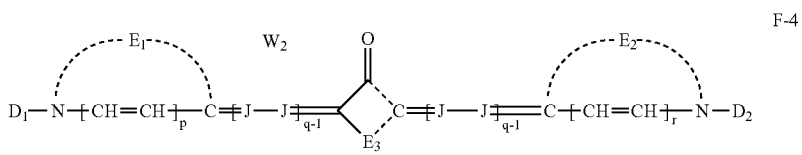

F-4 wherein $D_1$, $E_1$, $D_2$, $E_1$, J, p, q, r and $W_2$ are as defined for formula F-1 above, and $E_3$ is defined the same as $E_4$ for formula F-2 above;

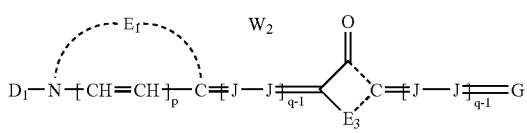

F-5 wherein $D_1$, $E_1$, J, G, p, q, r, $W_2$ and $E_3$ are as defined above.

In the above formulas, $E_1$ and $E_2$ each independently represents the atoms necessary to complete a substituted or unsubstituted 5- or 6-membered heterocyclic nucleus. These include a substituted or unsubstituted: thiazole nucleus, oxazole nucleus, selenazole nucleus, quinoline nucleus, tellurazole nucleus, pyridine nucleus, thiazoline nucleus, indoline nucleus, oxadiazole nucleus, thiadiazole nucleus, or imidazole nucleus. This nucleus may be substituted with known substituents, such as halogen (e.g., chloro, fluoro, bromo), alkoxy (e.g., methoxy, ethoxy), substituted or unsubstituted alkyl (e.g., methyl, trifluoromethyl), substituted or unsubstituted aryl, substituted or unsubstituted aralkyl, sulfonate, and others known in the art.

In one embodiment of the invention, when dyes according to formula F-1 are used $E_1$ and $E_2$ each independently represent the atoms necessary to complete a substituted or unsubstituted 5- or unsubstituted selenazole nucleus, a substituted or unsubstituted imidazole nucleus, or a substituted or unsubstituted oxazole nucleus.

Examples of useful nuclei for $E_1$ and $E_2$ include: a thiazole nucleus, e.g., thiazole, 4-methylthiazole, 4-phenylthiazole, 5-methylthiazole, 5-phenylthiazole, 4,5-dimethyl-thiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylbenzothiazole, 5-hydroxybenzothiazole, 6-5-dihydroxybenzothiazole, naphtho[2,1-d]thiazole, 5-ethoxynaphtho[2,3-d]thiazole, 8-methoxynaphtho[2,3-d]thiazole, 7-methoxynaphtho[2,3-d]thiazole, 4'-methoxythianaphtheno-7', 6'-4,5-thiazole, an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-ethoxybenzoxazole, 5-chlorobenzoxazole, 6-methoxybenzoxazole, 5-hydroxybenzoxazole, 6-hydroxybenzoxazole,, naphtho[2,1-d]oxazole, naphtho[1,2-d]oxazole, a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, a pyridine nucleus, e.g., 2-pyridine, 5-methyl-2-pyridine, 4-pyridine, 3-methyl-4-pyridine, 3-methyl-4-pyridine, a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, a tellurazole nucleus, e.g., benzotellurazole, naphtho[1.2-d]benzotellurazole, 5,6-dimethoxybenzotellurazole, 5-methoxybenzotellurazole, 5-methylbenzotellurazole; a thiazoline nucleus, e.g., thiazoline, 4-methylthiazoline,; a benzimidazole nucleus, e.g., benzimidazole, 5-trifluoromethylbenzimidazole, 5,6-dichlorobenzimidazole; and indole nucleus, 3,3-dimethylindole, 3,3-diethylindole, 3,3,5-trimethylindole; or a diazole nucleus, e.g., 5-phenyl-1,3,4-oxadiazole, 5-methyl-1,3,4-thiadiazole.

F and F' are each a cyano group, an ester group such as ethoxy carbonyl, methoxycarbonyl, an acyl group, a carbamoyl group, or an alkylsulfonyl group such as ethylsulfonyl, methylsulfonyl. Examples of useful nuclei for $E_4$ include a 2-thio-2,4-oxazolidinedione nucleus (i.e., those of the 2-thio-2,4-(3H,5H)-oxaazolidinone series) (e.g., 3-ethyl-2-thio-2,4 oxazolidinedione, 3-(2-sulfoethyl)-2-thio-2,4 oxazolidinedione, 3-(4-sulfobutyl)-2-thio-2,4 oxazolidinedione, 3-(3-carboxypropyl)-2-thio-2,4 oxazolidinedione, a thianaphthenone nucleus (e.g., 2-(2H)-thianaphthenone), a 2-thio-2,5-thiazolidinedione nucleus (i.e., the 2-thio-2,5-(3H,4H)-thiazoledeione series) (e.g., 3-ethyl-2-thio-2,5-thiazolidinedione); a 2,4-thiazolidinedione nucleus (e.g., 2,4-thiazolidinedione, 3-ethyl-2,4-thiazolidinedione, 3-phenyl-2,4-thiazolidinedione, 3-a-naphthyl-2,4-thiazolidinedione); a thiazolidinone nucleus (e.g., 4-thiazolidinone, 3-ethyl-4-thiazolidinone, 3-phenyl-4-thiazolidinone, 3-a-naphthyl-4-thiazolidinone); a 2-thiazolin-4-one series (e.g., 2-ethylmercapto-2-thiazolin-4-one, 2-alkylphenyamino-2-thiazolin-4-one, 2-diphenylamino-2-thiazolin-4-one) a 2-imino-4-oxazolidinone (i.e., pseudohydantoin) series (e.g., 2,4-imidazolidinedione (hydantoin) series (e.g., 2,4-imidazolidinedione, 3-ethyl-2,4-imidazolidinedione, 3-phenyl-2,4-imidazolidinedione, 3-a-naphthyl-2,4-imidazolidinedione, 1,3-diethyl-2,4-imidazolidinedione, 1-ethyl-3-phenyl-2,4-imidazolidinedione, 1-ethyl-2-a-naphthyl-2,4-imidazolidinedione, 1,3-diphenyl-2,4-imidazolidinedione); a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(2-carboxyethyl)-2-thio-2,4-imidazolidinedione, 3-phenyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-naphthyl-2-thio-2,4-imidazolidinedione, 1,3-diphenyl-2-thio-2,4-imidazolidinedione); and a 2-imidazolin-5-one nucleus.

$G_2$ represents an amino group (e.g., primary amino, anilino), or an aryl group (e.g., phenyl, naphthyl, dialkylaminophenyl, tolyl, chlorophenyl, nitrophenyl).

According to the formulas F-1 to F-5, each J represents a methine group. Examples of substituents for the methine groups include alkyl (preferably of from 1 to 6 carbon atoms, e.g., methyl, ethyl) and aryl (e.g., phenyl). Additionally, substituents on the methine groups may form bridged linkages.

$W_2$ represents a counterion as necessary to balance the charge of the sensitizing dye. Such counterions include cations and anions for example sodium, potassium, triethylammonium, tetramethylguanidinium, diisopropylammonium and tetrabutylammonium, chloride, bromide, iodide, and para-toluene sulfonate.

$D_1$ and $D_2$ are each independently aryl groups (preferably of 6 to 15 carbon atoms), or more preferably, alkyl groups (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, and dodecyl and substituted alkyl groups (preferably a substituted lower alkyl containing from 1 to 6 carbon atoms), such as a hydroxyalkyl group, e.g., 2-hydroxyethyl, 4-hydroxybutyl, a carboxyalkyl group, e.g., 2-carboxyethyl, 4-carboxybutyl, a sulfoalkyl group, e.g., 2-sulfoethyl, 3-sulfobutyl, 4-sulfobutyl, and a sulfatoalkyl group, an acyloxyalkyl group, e.g., 2-acetoxyethyl, 3-acetoxypropyl, and 4-butyroxybutyl, an alkoxycarbonlyalkyl group, e.g., 2-methoxycarbonlyethyl, 4-ethoxycarbonylbutyl, or an aralkyl group, e.g., benzyl, phenethyl.

According to a different embodiment, the photoinitiator dye useful in the composition of the invention is an oxonol dye. Oxonol dyes can be a methine oxonol dye having the following formula:

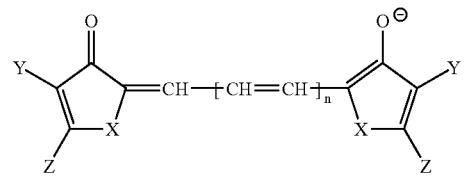

wherein n is 0, 1, or 2; X is $SO_2$, CO, NR, Y and Z are the same or different alkyl or aryl groups, and optionally can combine to form a saturated, unsaturated, or aromatic ring system, and R is an alkyl or substituted alkyl group. These dyes have been disclosed in detail in U.S. Pat. No. 5,274, 109, incorporated therein by reference.

Other oxonols useful in the present invention can be any oxonol dyes disclosed in U.S. Pat. Nos. 4,877,721, 5,674, 669, EP 740,200, EP 549,486, EP 246,553.

The photoinitiator dyes useful in the composition of the present invention can also be squarilium dyes. The squarilium can have the following formula:

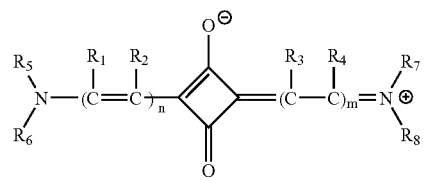

wherein: $R_1$, $R_2$, $R_3$ and $R_4$ each independently represents hydrogen, hydroxy, halogen, cyano, alkoxy, aryloxy, acyloxy, aryloxycarbonyl, alkoxycarbonyl, sulfonyl, carbamoyl, acyl, acylamido, alkylamino, arylamino or a substituted or unsubstituted alkyl, aryl or hetaryl group; or any of said $R_1$, $R_2$, $R_3$ or P4 groups may be combined with $R_5$, $R_6$, $R_7$ or $R_8$ or with each other to form a 5 to 7-membered substituted or unsubstituted carbocyclic or heterocyclic ring; $R_5$, $R_6$, $R_7$ and $R_8$ each independently represents hydrogen, a substituted or unsubstituted alkyl or cycloalkyl group having from 1 to about 6 carbon atoms or an aryl or hetaryl group having from about 5 to about 10 atoms; or $R_5$ and $R_6$ or $R_7$ and $R_8$ may be joined together to form a 5 to 7-membered substituted or unsubstituted nitrogen-containing heterocyclic ring; and n and m are each independently 1 to 4. These dyes have been disclosed in detail in U.S. Pat. No. 4,942,141, incorporated therein by reference.

Specific non-limiting examples of photoinitiator dyes useful in the invention are:

Cyanine Dyes
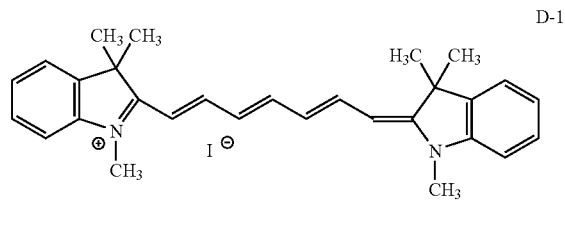
D-1
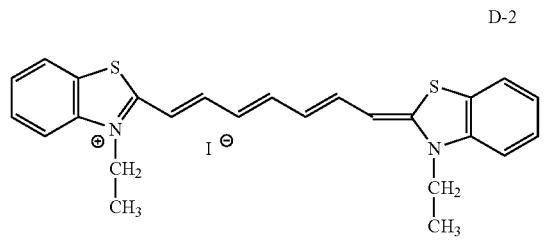
D-2
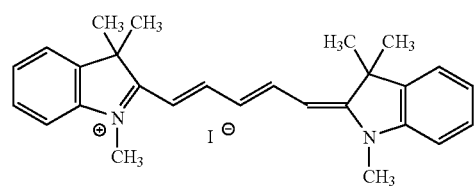
D-3
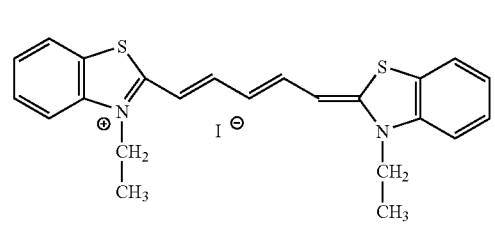
D-4
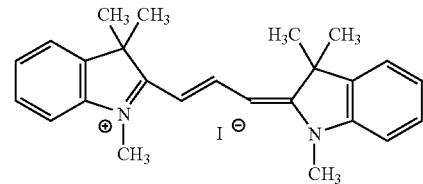
D-5
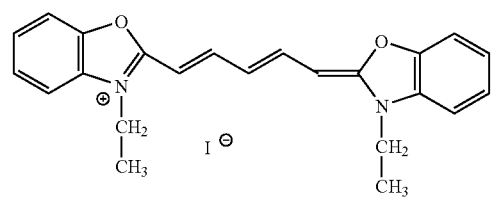
D-6
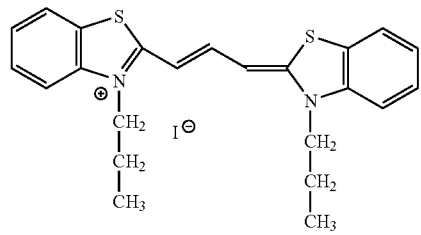
D-7
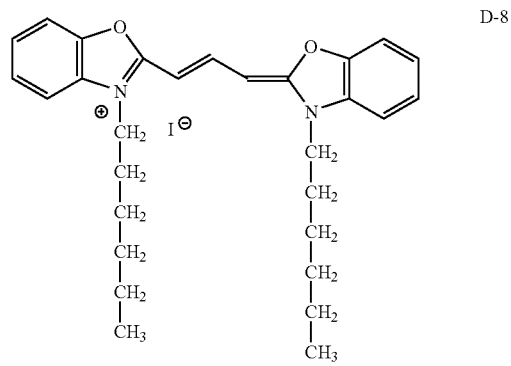
D-8
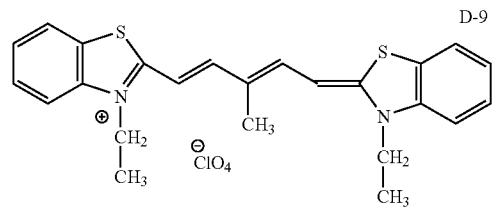
D-9

-continued
D-10
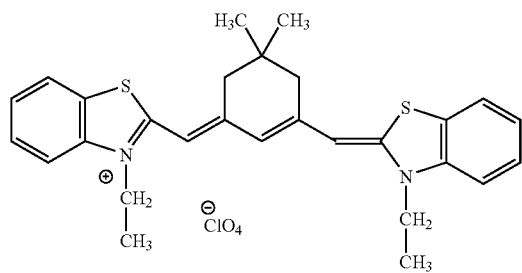
D-11
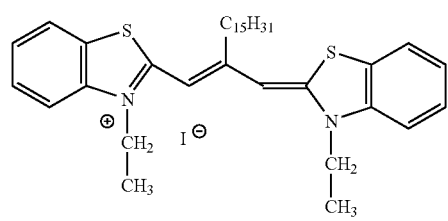
D-12
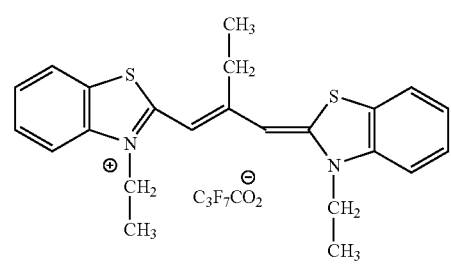
D-13
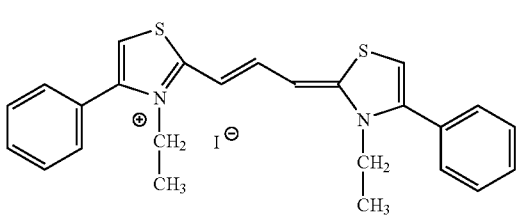
Coumarin Dyes
D-14
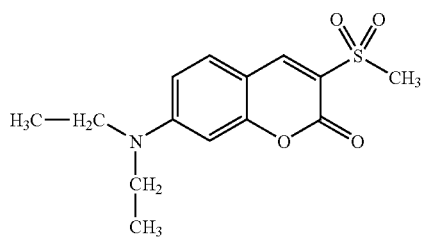
D-15
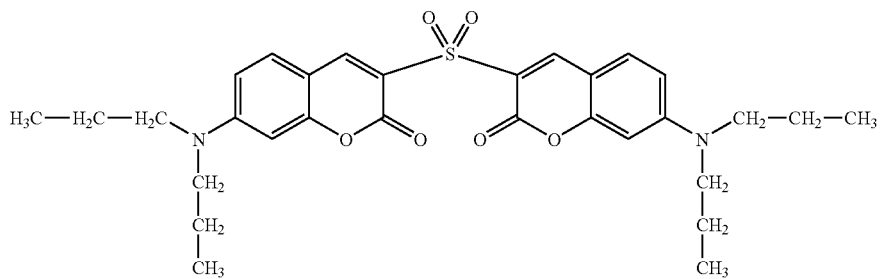
D-16
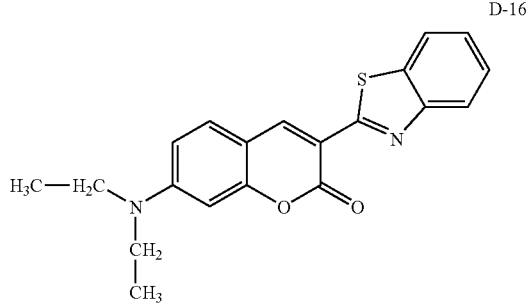

-continued
Styryl Pyridinium Dyes
D-17
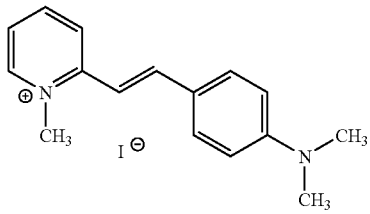
D-18
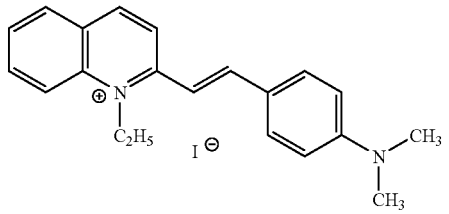
D-19
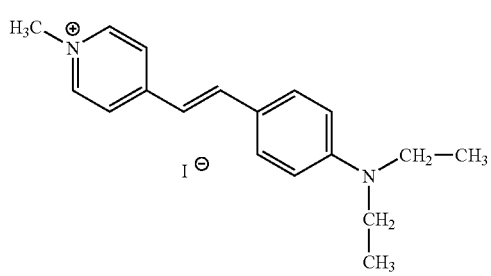
Rhodamine Dyes
D-20
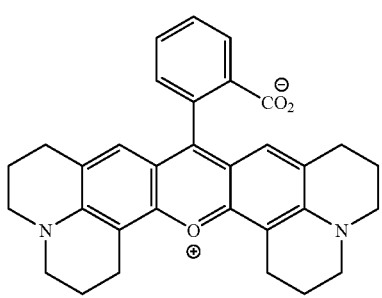
D-21
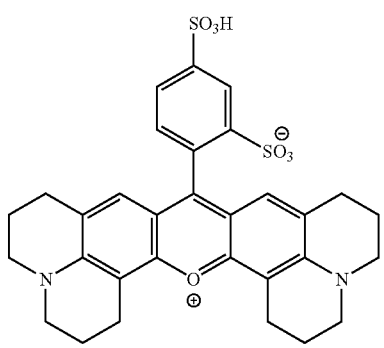
Acridine Dyes
D-22
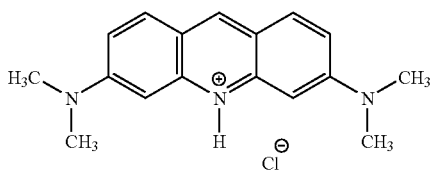
D-23
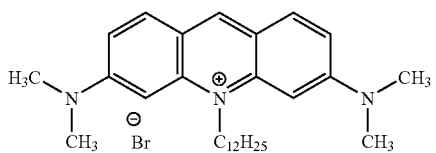
Oxonol Dyes
D-24
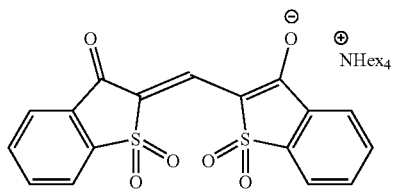
D-25
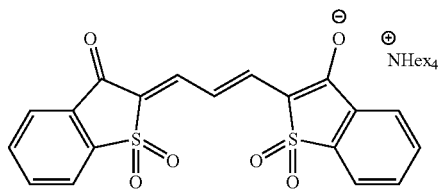

-continued

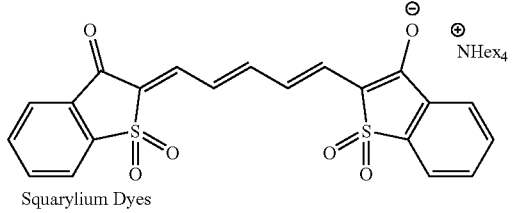
D-26
Squarylium Dyes

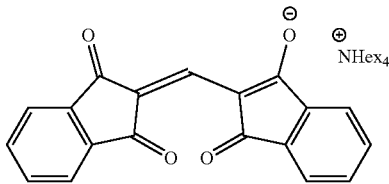
D-27

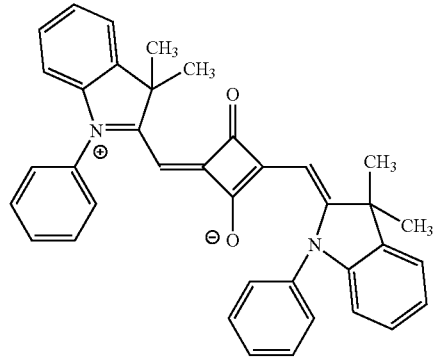
D-28

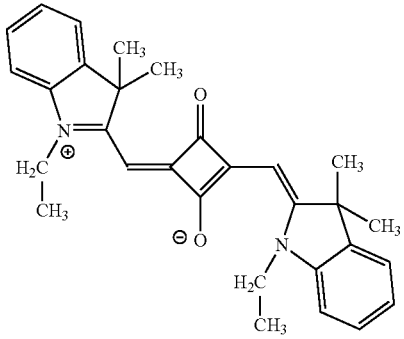
D-29

Activators (N-oxyazinium Compounds)

In the scope of the invention, the N-oxyazinium compound is an N-oxy-N-heterocyclic compound having a heterocyclic nucleus, such as a pyridinium, diazinium, or triazinium nucleus. The N-oxyazinium compound can include one or more aromatic rings, typically carbocyclic aromatic rings, fused with the N-oxy-N-heterocyclic compound, including quinolinium, isoquinolinium, benzodiazinium, phenanthridium and naphthodiazinium. Any convenient charge balancing counter-ion can be employed to complete the N-oxyazinium compounds. The oxy group (—O—$R_1$) of the N-oxyazinium compound which quaternizes the ring nitrogen atom of the azinium nucleus can be selected from among a variety of synthetically convenient oxy groups.

Illustrative examples of useful N-oxyazinium compounds are shown by the formulae below:

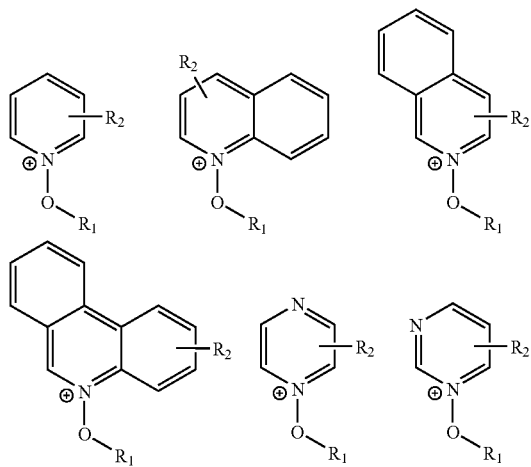

-continued

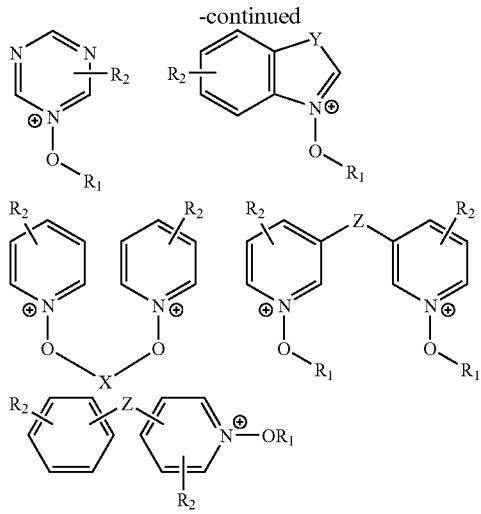

wherein $R_1$ represents alkyl group of 1–12 carbons, or alkyl group substituted with one or more groups selected from the group consisting of acyloxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminocarbonyl, alkylaminocarbonyloxy, arylaminocarbonyloxy, acylamino, carboxy, sulfo, trihalomethyl, alkyl, aryl, heteroaryl, alkylureido, arylureido, succinimido, and phthalimido substituent; aryl group, or acyl group; $R_2$ represents independently hydrogen, an alkyl group of 1–12 carbons, an aryl or heteroaryl group, unsubstituted or substituted with one or more substituents selected from the group consisting of an acyloxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminicarbonyl, alkylaminocarbonyloxy, arylaminocarbonyloxy, acylamino, carboxy, sulfo, trihalomethyl, alkyl, aryl, heteroaryl, alkylureido, arylureido, succinimido and phthalimido substituent, or an acyloxy, hydroxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminicarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimido, phthalimido group, —CO—$R_3$ wherein $R_3$ is an alkyl or an aryl group, or —(CH=CH)$_m$—$R_4$ wherein $R_4$ is an aryl or heterocyclic group; m is 1 or 2; Y is selected from the group consisting of S, O, Se, —C($R_1$)$_2$, and —$NR_1$; X is a divalent linking group selected from a group consisting of substituted or unsubstituted methylenes, (—$CR_5R_7$—)$_n$ and [(—$CR_5R_7$)$_n$—$X_1$—($CR_5R_7$—)$_p$] wherein $R_5$ or $R_7$ are independently hydrogen, alkyl, substituted alkyl, aryl, substituted aryl, heteroaryl, substituted heteroaryl group, n and p are from 1–12, $X_1$ is aryl or heteroaryl nuclei, carbonyl, sulfo, thio, oxy; and Z is an alkylidene group.

In the invention, each of the above formulae can comprise one or more $R_2$ groups.

According to one embodiment, the N-oxyazinium compound is a compound having one of the following formulae:

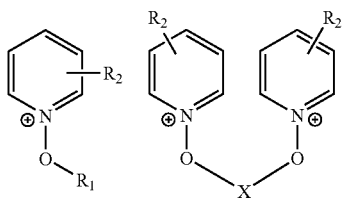

wherein $R_1$ is an alkyl, an aryl or an acyl, $R_2$ are independently a hydrogen atom, alkyl, aryl, heterocyclic, carboxylic, carboxylate, carbonamido, sulfonamido, nitryl, groups, —CO—$R_3$ wherein $R_3$ is an alkyl group or aryl group, or —(CH=CH)$_m$—$R_4$ group wherein $R_4$ is an aryl or heterocyclic group; X is an alkylene group, preferably —(CH$_2$)$_n$— wherein n is from 1 to 12.

According to a specific embodiment, $R_1$ is preferably an alkyl having from 1 to 6 carbon atoms or an aryl group having from 6 to 18 carbon atoms. This is preferred because of the ease of synthesis and handling.

According to a preferred embodiment, the N-oxyazinium compound has a reduction potential less negative than −1.4 V, and comprises an N-oxy group capable of releasing an oxy radical. This is preferred because it would be easy to reduce by an excited photoinitiator dye.

The composition of the invention can contain one or more of any of the N-oxyazinium compounds disclosed therein.

The N-oxyazinium compounds are associated with a counter ion that is not involved in the activity of the present composition and can be any of the conventional anions, e.g., halide, fluoroborate, hexafluorophosphate, toluene sulfonate. It can also be an oligomeric or polymeric species.

Specific non-limiting N-oxyazinium activators useful in the invention are:

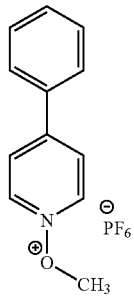
A-1

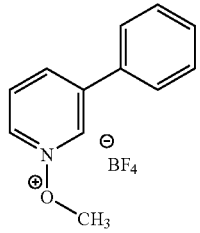
A-2

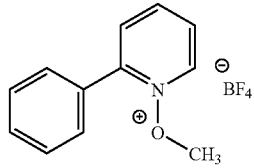
A-3

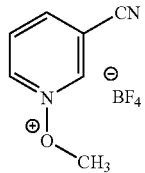
A-4

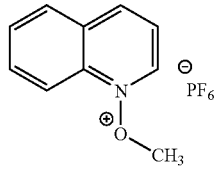
A-5

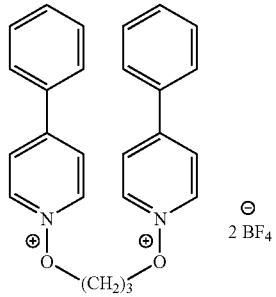
A-6

Matrix by Step Reaction Polymerization

Matrix precursors other than those derived from ethylenically unsaturated compounds are also contemplated. Specifically, compounds or mixture of compounds that polymerize (cure) by step reaction are contemplated. Systems that polymerize spontaneously at ambient or slightly elevated temperatures are preferred. Once again, the components of the alternative matrix precursor must be chosen so as not to suppress the subsequent optical recording element. Those skilled in the art will recognize that certain common matrix precursor systems such as those containing organic amines are therefore unsuitable because of their unacceptably low oxidation potentials.

Among suitable matrix precursors are isocyanate-polyol formulations (polyurethanes), silicon hydride-vinyl formulations (hydrosilation), alkoxysilane curing (sol-gel) formulations. The matrix precursor ingredients can be monomeric, oligomeric, or polymeric species. Preferred matrix precursors for step reaction polymerization are those that can be polymerized at relatively low temperatures (25–80° C.).

Recording Media Physical Attributes

The optical recording element of the invention may be in the form of a self-supporting slab or disk. It may also be coated on a support such as poly(ethylene terephthalate), poly(ethylene naphthalate), polystyrene, cellulose acetate, inorganic supports such as glass, quartz, silicon. In a preferred embodiment, the support is a polyester or glass. The surface of the optional substrate may be treated in order to improve the adhesion of the recording layer to the support. For example, the surface may be corona discharge treated prior to applying the optical recording material. Alternatively, an under-coating or subbing layer, such as a layer formed from a halogenated phenol or a partially hydrolyzed vinyl chloride-vinyl acetate copolymer, can be applied to the surface of the support.

The recording layer thickness may range from about 1 μm to about 1 cm, preferably from about 100 μm to about 2000 μm.

Recording Media Reactants

As noted above, the reactant used in the invention is capable of undergoing a chemical transformation upon a one-electron oxidation, thus causing the change in optical properties in the exposed regions of the optical recording material. Such compounds undergo a photoinduced cation radical rearrangement to product species, a process that defines the recording event. With the product formation, there are accompanying changes in optical characteristics such as refractive index, fluorescence properties, or absorption spectrum. No new chemical bonds are formed between individual reactant molecules, therefore, there are negligible dimensional changes in the media during the recording event.

The reactant is usually present in a relatively high concentration. In a preferred embodiment, the reactant comprises from about 1 to about 50% by weight of said material, the recording sensitizer comprises from about 0.001 to about 10% by weight of the material, with the balance being binder.

The chemical transformation of the reactant is an isomerization including reactions such as cyclizations, cycloadditions and cycloreversions. General examples of such transformations are the interconversion between 1a and 1b or 2a and 2b.

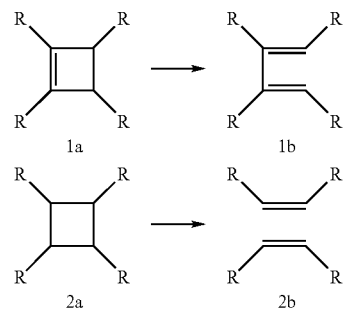

R in the formulas above and below can be H; a substituted or unsubstituted alkyl or alkoxy group having from about 1 to about 12 carbon atoms, preferably 1–3 carbon atoms, such as methyl, ethyl, isopropyl, butyl, a cyano or a carboxylate group; a substituted or unsubstituted aryl group having from about 6 to about 18 carbon atoms, such as phenyl, naphthyl, phenanthryl, anthryl, a substituted or unsubstituted heteroaromatic group such as furyl, thienyl, pyridyl, benzofuryl, benzothienyl. Substituents on the aryl or heteroaryl groups include, for example, one or more alkyl, aryl, alkoxyl, aryloxyl, thioalkyl, or thioaryl groups. In addition, some or all of the substituents R can be joined together to form additional ring systems.

Examples of 1a/1b are

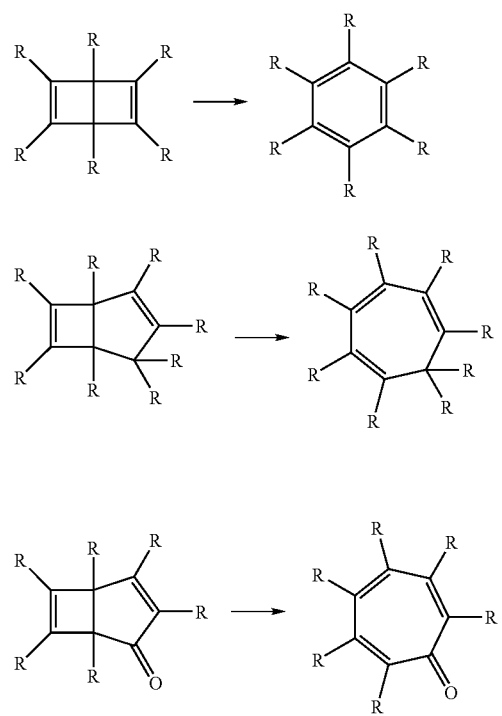

Examples of 2a/2b are

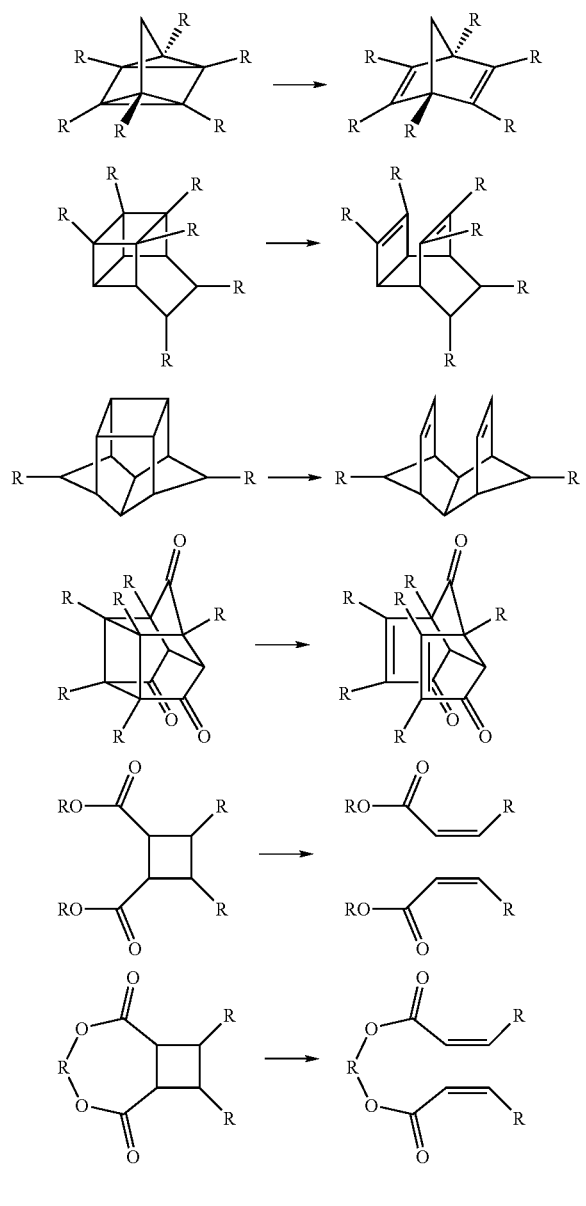

Reactants my be used singly or in any suitable combination.

In a preferred embodiment, the reactant may contain moieties specifically intended to participate in the in-situ polymerization, and thereby become covalently bound to the matrix. For example, reactants bearing ethylenically unsaturated moieties capable of undergoing free radical polymerization are contemplated in cases where the matrix precursor contains similar moieties. Methacrylate or acrylate esters, acrylamides, styrenes, etc. are useful in this regard. Similarly, reactants bearing one or more hydroxy groups may copolymerize with certain step reaction in-situ polymerizations, for example di-isocyanate/polyol curing chemistry.

Specific non-limiting examples of reactants 1 a and 2a are shown in Table 1.

TABLE 1

Reactants

R-1

$H_3C$, $CH_3$, $CH_3$
$H_3C$, $CH_3$, $CH_3$

R-2

$H_3C$, $CH_3$, $CO_2C_2H_5$
$H_3C$, $CH_3$, $CH_3$

R-3

$H_3C$, $CH_3$, $CO_2C_2H_6$
$H_3C$, $CH_3$, phenyl

R-4

$H_3C$, $CH_3$, $CO_2C_2H_6$
$H_3C$, $CH_3$, $C_6H_4$-CN

R-5

$H_3C$, $CH_3$, $CO_2CH_3$
$H_3C$, $CH_3$, $C_6H_4$-$OCH_3$

R-6

$H_3C$, $CH_3$, $CO_2CH_3$
$H_3C$, $CH_3$, $CO_2CH_3$

R-7

$H_3C$, $CH_3$, C(O)-N(propyl)$_2$
$H_3C$, $CH_3$, C(O)-N(propyl)$_2$

TABLE 1-continued
| Reactants | |
|---|---|
| R-8 | 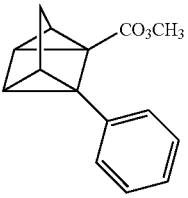 |
| R-9 | 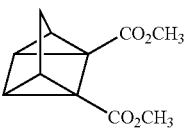 |
| R-10 | 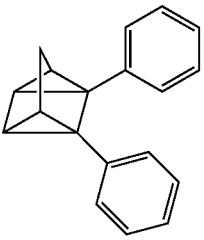 |
| R-11 | 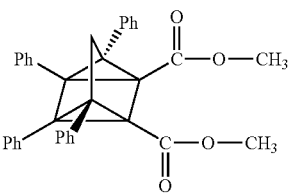 |
| R-12 | 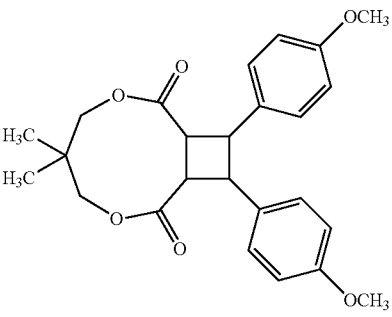 |
| R-13 | 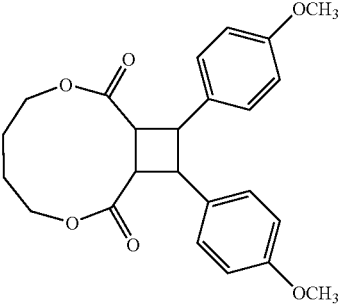 |
| R-14 | 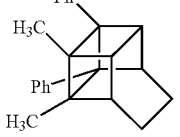 |
| R-15 | 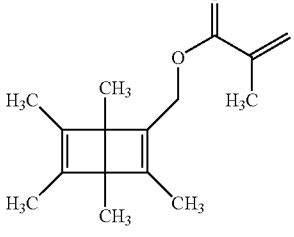 |
| R-16 | 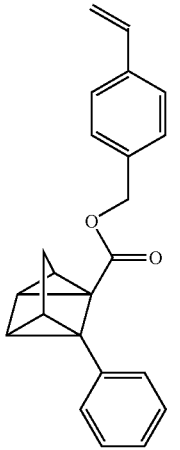 |
| R-17 | 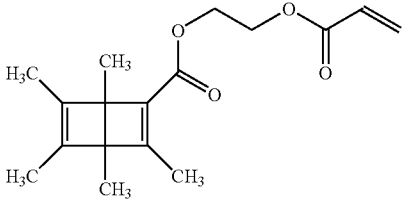 |
| R-18 | 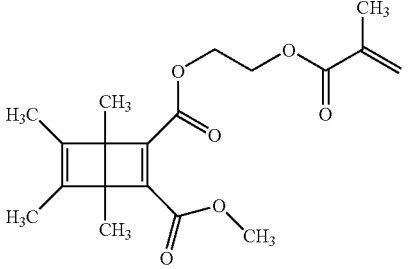 |

TABLE 1-continued

Reactants

R-19 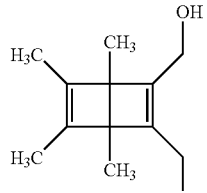

R-20 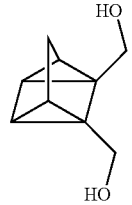

In a preferred embodiment, the reactant is selected so that its oxidation potential is less than that of its product, and that a suitably rapid isomerization can occur upon electron transfer to the recording sensitizer as described in further detail below.

Recording Sensitizers

The recording sensitizer used in the invention initiates the chemical transformation of the reactant (i.e., isomerization of the reactant to the product). The recording sensitizer must be capable of oxidizing the reactant to a radical cation after the recording sensitizer has absorbed light (i.e., photoinduced electron transfer). There are two distinct classes of recording sensitizers that may be used in the invention.

In one embodiment, the recording sensitizer upon absorption of the actinic radiation is capable of accepting an electron from the reactant. Examples of such recording sensitizers include those shown in Tables 2 and 3.

In another embodiment of the invention, the recording sensitizer upon absorption of actinic radiation fragments results in an oxidant capable of accepting an electron from the reactant. Examples of such sensitizers include those shown in Table 4.

Sensitization via Photo-induced Electron Transfer

Reaction energetics may be used to determine whether a recording sensitizer is capable of oxidizing the reactant to a radical cation after the recording sensitizer has absorbed light. There are three controlling parameters in reaction energetics: the excitation energy ($E_{S^*}$) and the reduction potential ($E_S^{red}$) of the sensitizing electron acceptor (S) and the oxidation potential ($E_R^{ox}$) of the reactant (R), an electron donor. For these reactions to be energetically feasible, the energy of the excited state should be higher or only slightly lower than the energy stored in the primary product, the radical ion pair, $S^-R^+$.

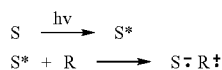

The excitation energy of the recording sensitizer (electron acceptor) is conveniently determined from the midpoint of the normalized absorption and emission spectrum of S, if the reaction proceeds from the singlet excited state. However, if the reaction proceeds via the triplet state, then the triplet energy of S should be used as the excitation energy.

The energy of the radical ion pair, $E_{IP}$, is given by Eq. 1, where $\Delta$ is an energy increment that depends on the medium polarity and ranges from nearly zero in highly polar media to ca. 0.3 eV in the least polar media. The oxidation ($E_R^{ox}$) and reduction ($E_S^{red}$) are readily obtained from conventional electrochemical measurements in polar solvents such as acetonitrile or methylene chloride $$E_{IP}=E_R^{ox}-E_S^{red}+\Delta \qquad \text{Eq. 1}$$

Polymeric media tend to be low in dielectric constant, and as a result would not strongly solvate the radical ion pair. Thus, the energy increment $\Delta$ in Eq. 1 is expected to be near the maximum value, i.e., in the range of 0.2 to 0.3 eV.

Thus, sensitizing electron acceptors with excitation energy equal to or larger than the difference between the oxidation potential of the reactant and the reduction potential of the acceptor, ($E_R^{ox}-E_S^{red}$), will satisfy the energetic requirements of photoinitiating the reaction, Eq. 2.

$$E_{S^*} \geq E_R^{ox}-E_S^{red} \qquad \text{Eq. 2}$$

It is more convenient to express the energetic requirements of the sensitizing acceptor relative to the donor in terms of a rearranged form of Eq. 2.

$$E_{S^*}+E_S^{red} \geq E_R^{ox} \qquad \text{Eq. 3}$$

According to Eq. 3, for the reaction to be energetically feasible, the algebraic sum of the excitation energy of the recording sensitizer and its reduction potential should be approximately equal to or larger than the oxidation potential of the reactant.

For the specific example of the reactant hexamethyldewarbenzene, which has an oxidation potential of 1.59 V vs. SCE, numerous sensitizing acceptors, which meet the requirement of Eq. 3, can be used. Listed in Table 2 are some of the compounds that meet the requirements, namely having the sum of excitation energy plus reduction potential that is equal to or exceeds 1.59 eV, and are therefore useful with hexamethyldewarbenzene reactant.

TABLE 2

| Electron Transfer Recording Sensitizers | | $E_{S^*}$ | $E^{red}_S$ |
|---|---|---|---|
| S-1 | 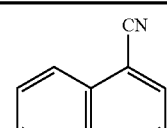 | 3.85 | −1.88 |
| S-2 | 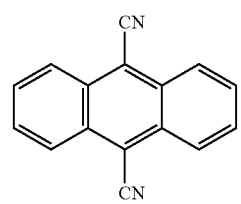 | 2.90 | −0.91 |

TABLE 2-continued

Electron Transfer Recording Sensitizers

| | Sensitizer | $E_{S^*}$ | $E^{red}_S$ |
|---|---|---|---|
| S-3 | (N-methylquinolinium) | 3.53 | −0.85 |
| S-4 | (9-dicyclohexylmethyl-N-methylacridinium) | 2.77 | −0.48 |
| S-5 | (2,4,6-triphenylpyrylium) | 2.84 | −0.40 |

In general, derivatives from many different compounds can be used as electron accepting recording sensitizers for various reactants, provided that the energetic requirements discussed above are satisfied. These potential recording sensitizers include: cyanoaromatics such as 1-cyanonaphthalene, 1,4-dicyanonaphthalene, 9,10-dicyanoanthracene, 2,9,10-tricyanoanthracene, 2,6,9,10-tetracyanoanthracene; aromatic anhydrides and imides such as 1,8-naphthylene dicarboxylic, 1,4,6,8-naphthalene tetracarboxylic, 3,4-perylene dicarboxylic, and 3,4,9,10-perylene tetracarboxylic anhydride or imide; condensed pyridinium salts such as quinolinium, isoquinolinium, phenanthridinium, acridinium salts; and pyryllium salts. Among useful recording sensitizers that involve the triplet excited state are carbonyl compounds such as quinones such as benzo-, naphtho-, anthro-quinones with electron withdrawing substituents (e.g., chloro and cyano). Ketocoumarins especially those with strong electron withdrawing moieties such as pyridinium can also be used as recording sensitizers.

Examples of the above recording sensitizers are shown in Table 3. These recording sensitizers can optionally contain substituents such as methyl, ethyl, tertiary butyl, phenyl, methoxy, chloro that may be included to modify properties such as solubility, absorption spectrum, reduction potential.

TABLE 3

Electron Transfer Recording Sensitizers

| | Sensitizer |
|---|---|
| S-6 | 1,4-dicyanonaphthalene |
| S-7 | 2,9,10-tricyanoanthracene |
| S-8 | 2,6,9,10-tetracyanoanthracene |
| S-9 | 1,8-naphthalic anhydride |
| S-10 | N-methyl-methoxy-naphthalimide |
| S-11 | N,N'-bis(2,6-diisopropylphenyl)perylene-3,4,9,10-tetracarboxylic diimide |

TABLE 3-continued
Electron Transfer Recording Sensitizers
S-13 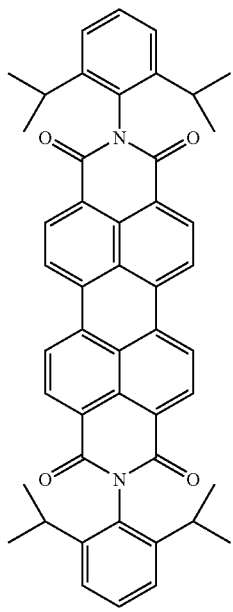
S-14 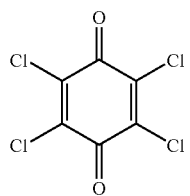
S-15 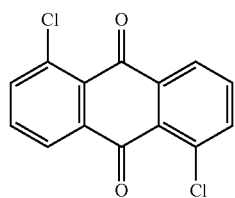
S-16 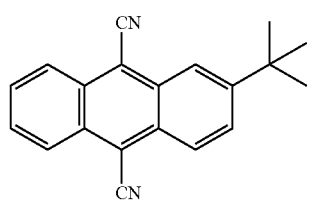
TABLE 3-continued
Electron Transfer Recording Sensitizers
S-17 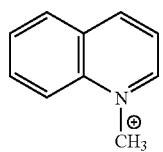
S-18 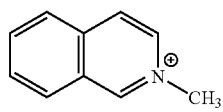
S-19 
S-20 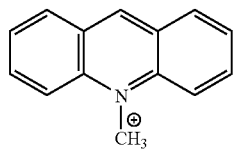
S-21 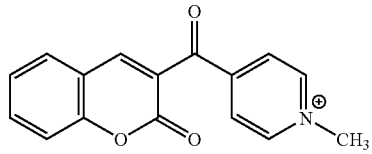
S-22 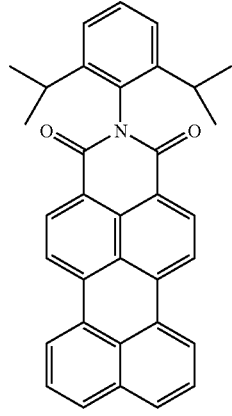

TABLE 3-continued

Electron Transfer
Recording Sensitizers

S-23

S-24

S-25

S-26

Sensitization via Photochemical Generation of a Radical Cation

In this approach, excitation leads to fragmentation of the recording sensitizer and the formation of an oxidizing radical cation. An example of this class of recording sensitizers is N-methoxyphenanthridinium, Eq. 4.

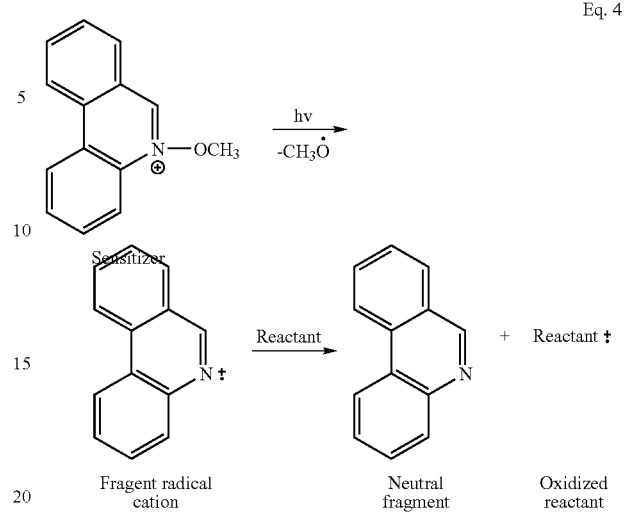

Eq. 4

In the above illustration, the recording sensitizer upon absorption of actinic radiation reacts to produce a fragment radical cation, the fragment radical cation then accepts an electron from the reactant, whereby the oxidation potential of the neutral fragment is greater than that of the reactant.

TABLE 4

Radical Cation-Generating Recording Sensitizers

S-25

S-26

S-27

S-28

TABLE 4-continued

Radical Cation-Generating Recording Sensitizers

S-29 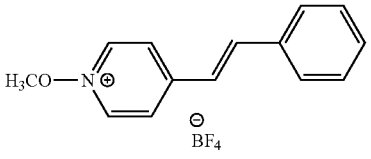

S-30 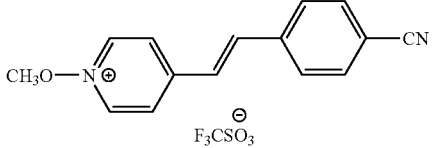

Where R = alkyl, substituted alkyl, aryl, or acyl.

The following examples illustrate the practice of this invention. They are not intended to be exhaustive of all possible variations of the invention. Parts and percentages are by weight unless otherwise indicated.

EXAMPLES

Example 1

Preparation of Optical Recording Material 1 by Photochemically Initiated in-situ Vinyl Free Radical Polymerization The example demonstrates the preparation of an optical recording material by photochemically induced in-situ polymerization The following solutions were prepared under red lights:

Solution A: A mixture of 49.58 g of pentaerythritol tetraacrylate (matrix precursor) and 5.56 g dibutyl phthalate (plasticizer)

Solution B: 37.71 g of solution A and 0.156 g of N-methoxy-4-phenylpyridinium hexafluorophosphate activator (A-1).

Solution C: 12.44 g of solution A and 0.0254 g of oxonol photoinitiator dye (D-24).

A solution was prepared containing 0.111 g of reactant R-15, 0.20 mg recording sensitizer S-16, 1.14 g of solution B, and 0.32 g of solution C. The mixture was sonicated for 5 min and then filtered using a Centrex MF-5 centrifugal filter equipped with a 0.45 μm nylon frit. After filtering, the mixture was transferred to a ½" OD flat-bottomed, fused silica tube. A Teflon-coated magnetic stir bar was added and then the tube was attached to a vacuum pump via a ½" Cajon UltraTorr fitting. The stirred solution was carefully degassed. A magnet was used to remove the stir bar from the solution. To initiate in-situ polymerization, the sample was irradiated vertically through the bottom of the sample tube by using 514 nm light from Coherent Innova 90 water-cooled argon ion laser that was spatially filtered and collimated. The intensity of this beam at the sample was 200 mW per square centimeter. The sample was irradiated for 60 min until the oxonol photoinitiator dye was bleached. The tube was removed from the vacuum fitting and sectioned into ca. 900 micron thick slabs with a Buehler Isomet low speed saw equipped with a 10.2 cm×0.3 mm, Series 15 high concentration diamond wafering blade (part number 11-4244) operating at ca. 60 rpm.

Preparation of Optically Recorded Article 1

To construct optical recording element 1, a slab of optical recording material 1 prepared above was glued between 25 mm×25 mm×1 mm glass slides using thermal set epoxy (Epoxy Technology, 301-2FL) at 80° C. for 1 h.

An optical recording apparatus such as that described in Dinnocenzo, et al., U.S. Pat. No. 6,569,600 B2 was assembled. The interferometer for grating fabrication at 413 nm consisted of a spatially filtered and collimated laser beam incident on a beam splitter at 26.565 degrees. The transmitted beam was directed by the first interferometer mirror to intersect the sample plane at an angle of −20.047 degrees. The reflected beam was directed by the second interferometer mirror to intersect the sample plane at an angle of +20.047 degrees. The resulting grating period was 602.55 nm corresponding to a Bragg angle of 31.675 degrees at a wavelength of 632.8 nm.

Using the optical recording apparatus, a holographic grating was written in optical recording element 1 by a 500 second exposure at approximately 2 mW per square centimeter. After recording, the optically recorded article 1 demonstrated a diffraction efficiency of approximately 0.01.

Example 2

Preparation of Optical Recording Material 2 by Thermally Initiated in-situ Polymerization The example demonstrates the preparation of an optical recording material by thermally induced in-situ free radical vinyl polymerization Solutions (1.5 g each) were prepared under yellow lights containing varying compositions of reactant R-15, pentaerythritol tetraacrylate (PTA, matrix precursor), methyl methacrylate (MMA, matrix precursor), and dibutyl phthalate (DBP, plasticizer), and ca. 0.004 g recording sensitizer S-16 and ca. 0.0005 g of thermal initiator 2,2'-azobis(isovaleronitrile). The solutions were filtered using a Centrex MF-5 centrifugal filter equipped with a 0.45 μm nylon flit. The filtered solutions were charged into Teflon-coated, 10×75 mm culture tubes. The tubes were sealed with a serum cap, sparged with helium for 10 min, and heated to 80° C. in an oil bath to initiate in-situ polymerization. After 24 h the tubes were removed from the oil bath and sectioned into ca. 900 micron thick slabs by the process described in example 1.

| Sample | wt % R-15 | wt % PTA | wt % MMA | wt % DBP |
|--------|-----------|----------|----------|----------|
| 2A | 10 | 10 | 80 | 0 |
| 2B | 9 | 8 | 74 | 9 |
| 2C | 20 | 20 | 60 | 0 |
| 2D | 30 | 18 | 52 | 0 |

To construct optical recording elements 2A–2D, slabs of optical recording materials 2A–2D prepared above were glued between 25 mm×25 mm×1 mm glass slides using thermal set epoxy (Epoxy Technology, 301-2FL) at 80° C. for 1 h.

An optical recording apparatus similar to that described in Example 1 was used. The interferometer for grating fabrication at 458 nm consisted of a spatially filtered and collimated laser beam incident on a beam splitter at 45 degrees. The transmitted beam was directed by the first interferometer mirror to intersect the sample plane at an angle of −22.332 degrees. The reflected beam was directed by the second interferometer mirror to intersect the sample plane at an angle of +22.332 degrees. The resulting grating period was 602.55 nm corresponding to a Bragg angle of 31.675 degrees at a wavelength of 632.8 nm.

Preparation of Optically Recorded Articles 2A–2D

Holographic gratings were written to the optically recording elements 2A–2D, using the recording apparatus described above at an intensity of approximately 70 mW per square centimeter. The writing times and resulting measured diffraction efficiencies are shown in Table 1.

TABLE 5

| Sample | Writing Time | Diffraction Efficiency |
|--------|--------------|------------------------|
| 2A | 1200 s | 0.05 |
| 2B | 1200 s | 0.10 |
| 2C | 500 s | 0.30 |
| 2D | 200 | 0.30 |

Example 3

Preparation of Optical Recording Material 3 by in-situ Step Reaction Polymerization to Form a Polyurethane Matrix The example demonstrates the preparation of an optical recording material by step reaction in-situ polymerization.

A mixture of 0.20 g of polypropylene glycol (matrix precursor, obtained from Aldrich Chemical Company, catalog number 20,230-4), 1.0 g of isocyanate-terminated polypropylene glycol (matrix precursor, obtained from Aldrich Chemical Company, catalog number 43,349-7), 0.15 g of reactant R-2, and approximately 0.005 g of recording sensitizer S-16 were mixed by solication until a homogeneous solution was obtained. Two drops of dibutyl tin diacetate (polymerization catalyst) were added, and the mixture was placed between two microscope slides separated by 0.1 mm polyester spacers. The polyurethane matrix was formed by heating the assembly at 50° C. for 18 h.

This invention has been described with particular reference to preferred embodiments thereof but it will be understood that modifications can be made within the spirit and scope of the invention.

What is claimed is:

1. An optically recorded article comprising a pattern of isomerized material in two isomeric forms in a cross linked matrix, wherein one of the isomeric forms is capable of being converted to the other form by one-electron oxidation and wherein said matrix was polymerized in-situ, and wherein said article further comprises a recording sensitizer.

2. The optically recorded article of claim 1 wherein said isomeric forms comprise

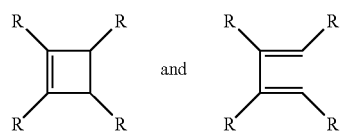

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

3. The optically recorded article of claim 2 wherein said isomeric forms comprise at least one of the following pairs:

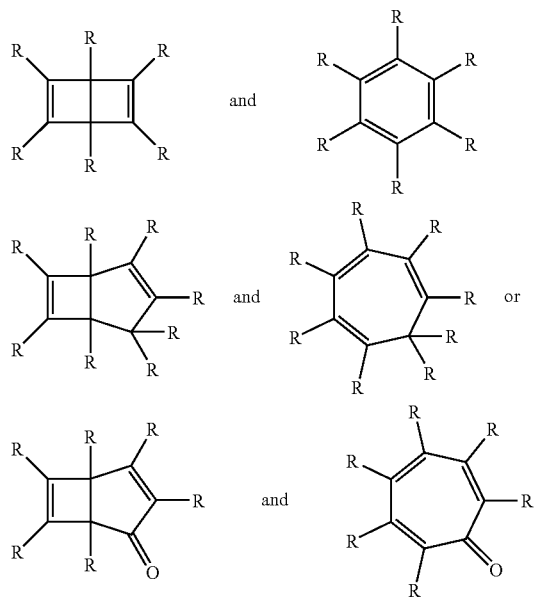

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

4. The optically recorded article of claim 3 wherein said isomeric forms comprise

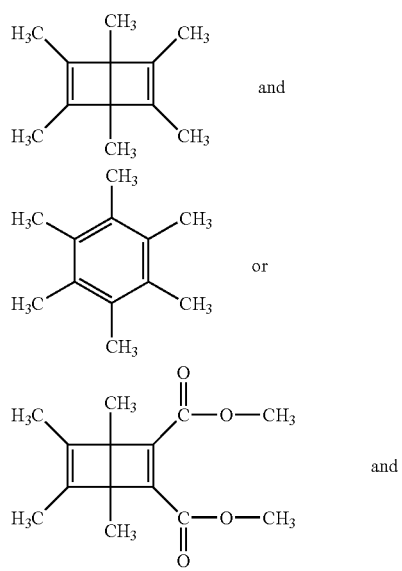

-continued

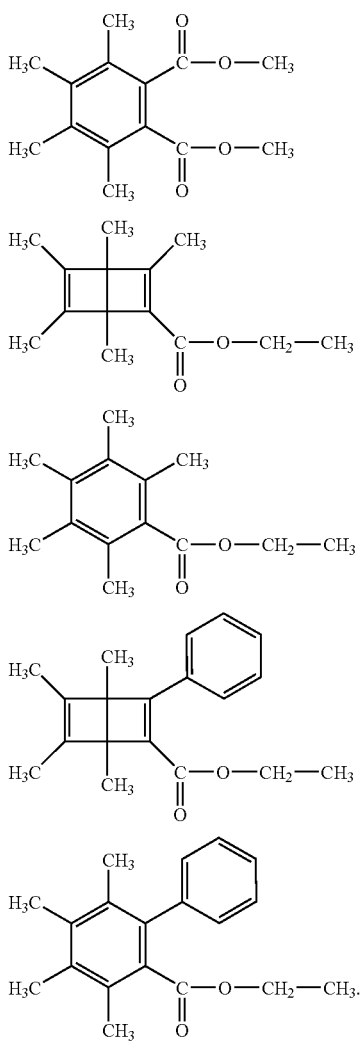

5. The optically recorded article of claim 1 wherein said isomeric forms comprise

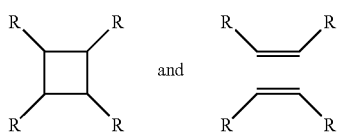

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

6. The optically recorded article of claim 5 wherein said isomeric forms comprise, at least one of the following isomeric pairs

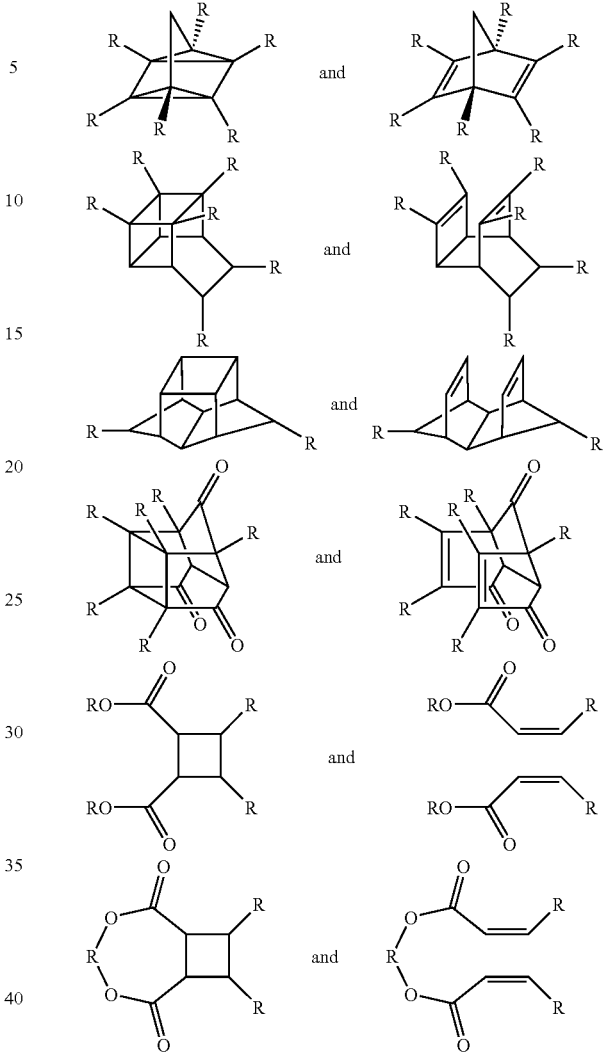

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

7. The optically recorded article of claim 6 wherein said two isomeric forms comprise at least one of the following isomeric pairs:

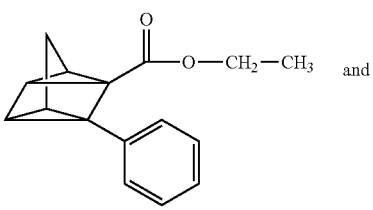

-continued

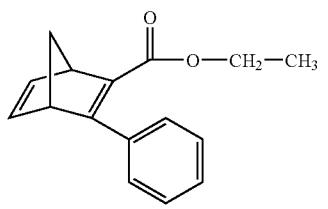

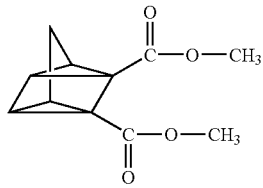 and

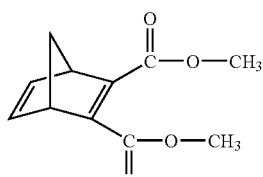 and

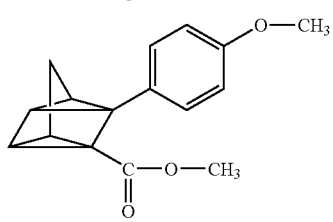 and

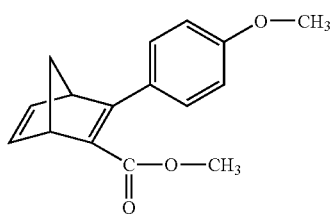

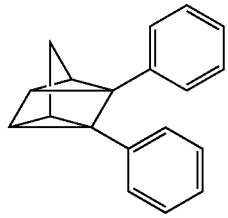 and

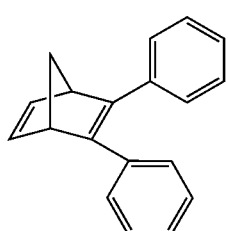 and

-continued

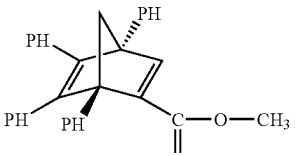

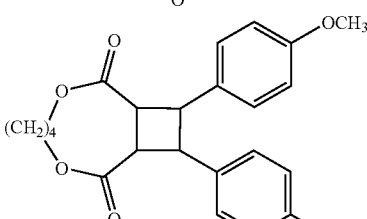 and

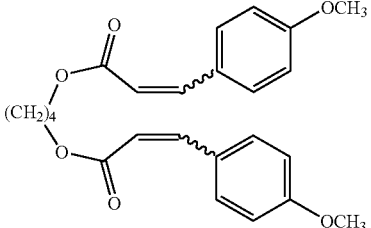 or

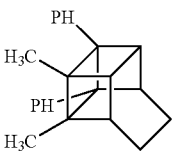 and 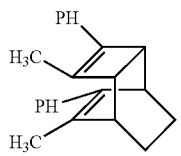

8. The optically recorded article of claim 1 wherein said matrix comprises a polymer formed from ethylenically unsaturated monomers.

9. The optically recorded article of claim 8 wherein said ethylenically unsaturated monomers are selected from the group consisting of methacrylic and acrylic esters.

10. The optically recorded article of claim 8 wherein said ethylenically unsaturated monomers have been thermally cured at less than 100° C.

11. The optically recorded article of claim 10 wherein said ethylenically unsaturated monomers have been thermally cured at between 20 and 80° C.

12. The optically recorded article of claim 1 wherein said pattern was formed by light that caused isomerization.

13. An optical recording material comprising an isomerizable material, an in-situ polymerized cross linked matrix and a recording sensitizer, wherein the isomerizable material is capable of photo-sensitized electron transfer forming an oxidized reactant, said oxidized reactant is transformed into an oxidized product.

14. The optical recording material of claim 13 wherein said oxidized product is capable of oxidizing additional said isomerizable material, thus defining the propagation of a chain reaction.

15. The optical recording material of claim 13 wherein the algebraic sum of the excitation energy of said recording sensitizer and its reduction potential is approximately equal to or larger than the oxidation potential of said isomerizable material whereby said recording sensitizer upon absorption of said actinic radiation will be capable of accepting an electron from said isomerizable material.

16. The optical recording material of claim 15 wherein said recording sensitizer is a cyanoaromatic compound, a pyridinium salt, a pyryllium salt, a thiopyryllium salt, a quinone, or a cyanine dye.

17. The optical recording material of claim 15 wherein said recording sensitizer is

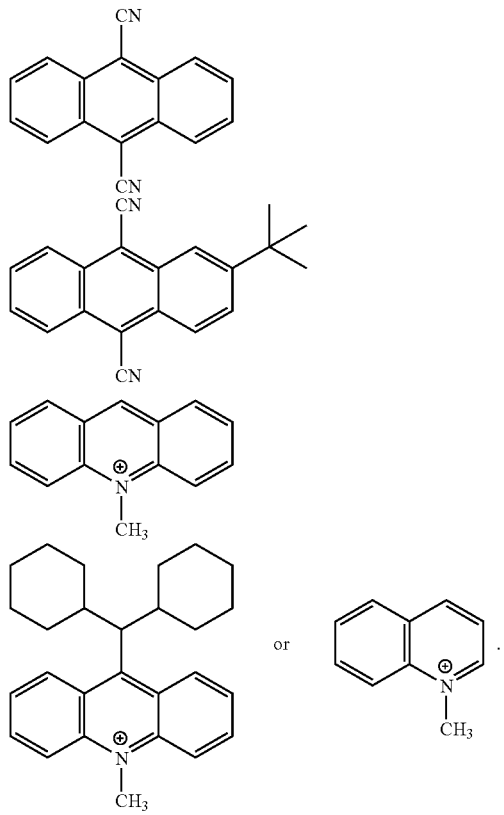

18. The optical recording material of claim 13 wherein said recording sensitizer upon absorption of actinic radiation reacts to produce a fragment radical cation, said fragment radical cation being capable of accepting an electron from said reactant, whereby the oxidation potential of the neutral fragment is greater than that of said isomerizable material.

19. The optical recording material of claim 18 wherein said recording sensitizer is:

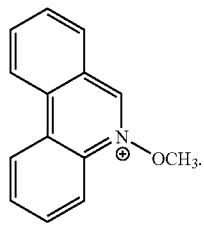

20. The optical recording material of claim 13 wherein said change in optical properties comprises a change in refractive indexes.

21. An optical recording material of claim 13 further comprising a support.

22. The optical recording material of claim 13 wherein said isomerizable material undergoes one of the following transformations:

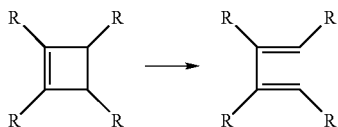

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

23. The optical recording material of claim 22 wherein said isomerizable material undergoes one of the following transformations:

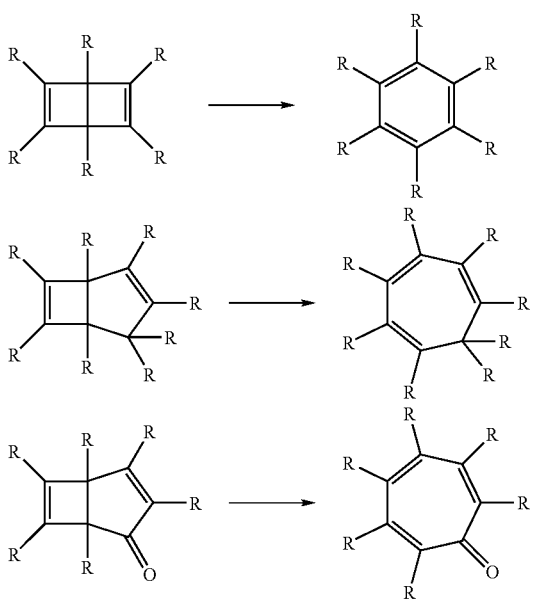

wherein R is
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

24. The optical recording material of claim 23 wherein said isomerizable material undergoes one of the following transformations:

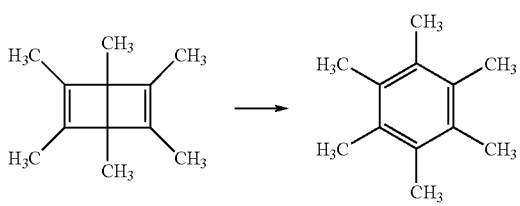

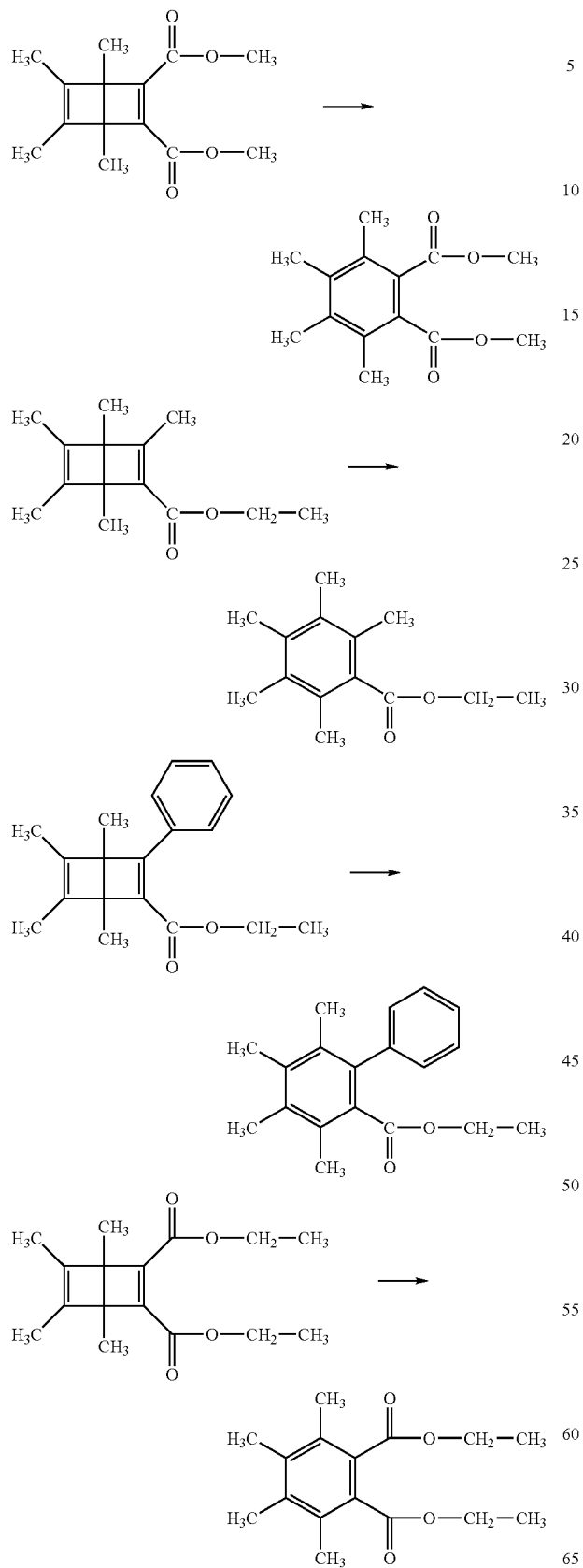

25. The optical recording material of claim 13 wherein said isomerizable material undergoes one of the following transformations

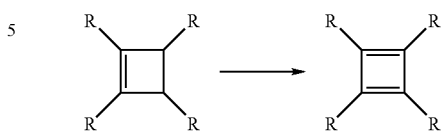

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

26. The optical recording material of claim 25 wherein said isomerizable material undergoes one of the following transformations:

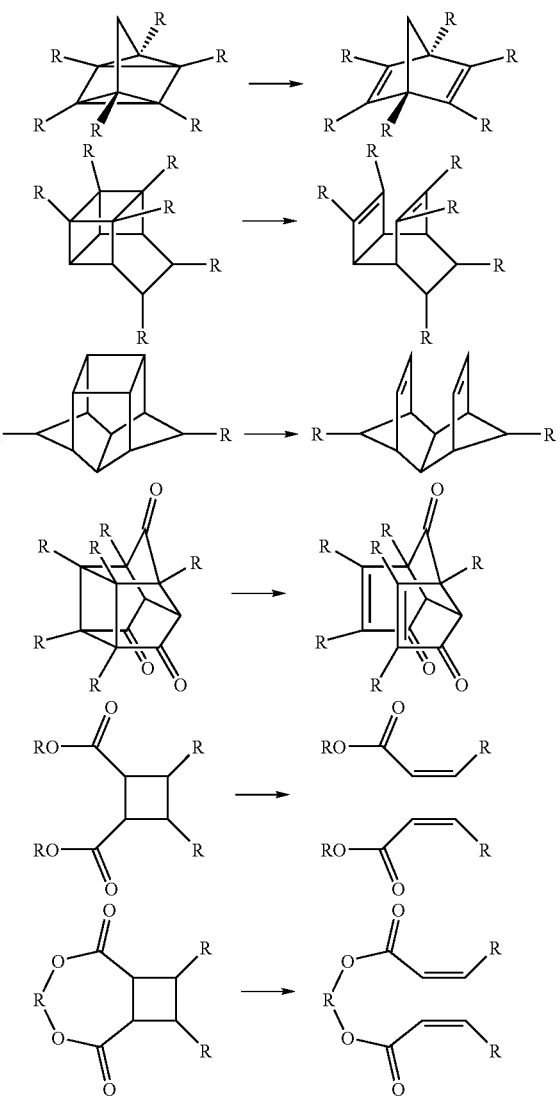

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

27. The optical recording material of claim 26 wherein said isomerizable material undergoes one of the following transformations:

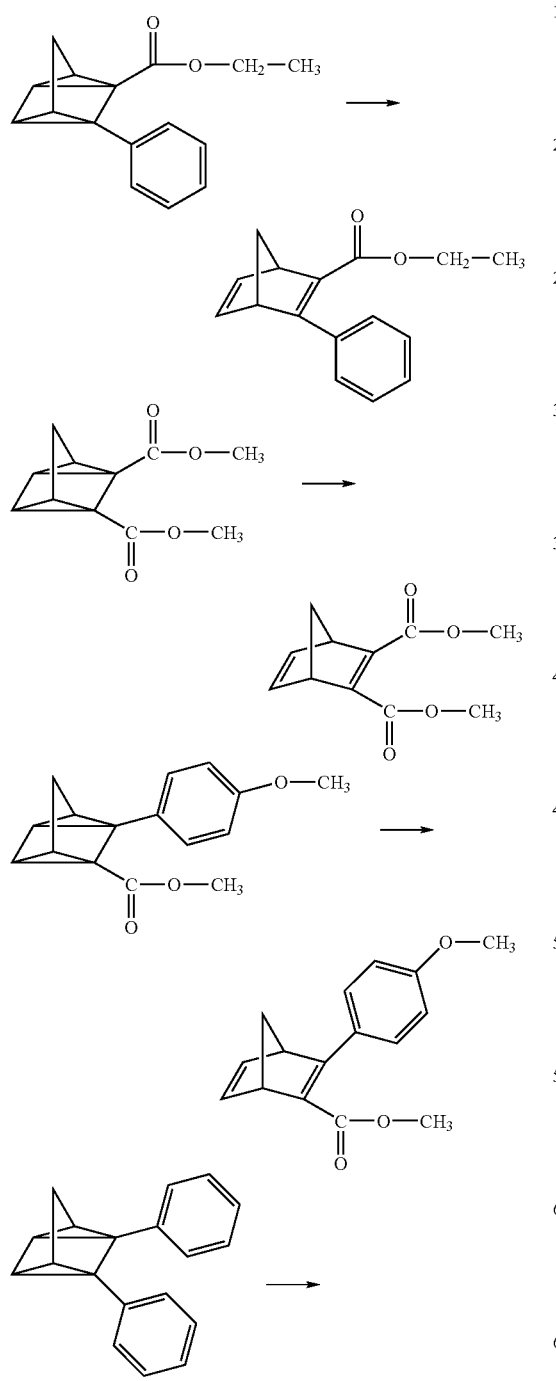

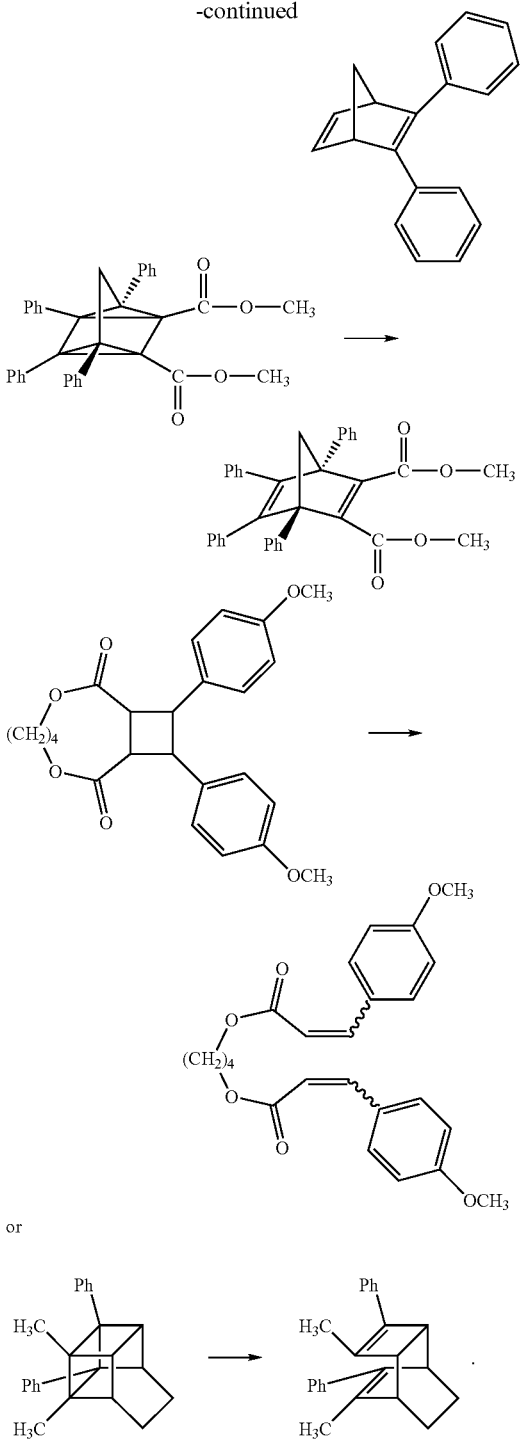

28. The optical recording material of claim 13 wherein said matrix comprises a polymer formed from ethylenically unsaturated monomers.

29. The optical recording material of claim 28 wherein said ethylenically unsaturated monomers are selected from the group consisting of methacrylic and acrylic esters.

30. The optical recording material of claim 28 wherein said ethylenically unsaturated monomers have been thermally cured at less than 100° C.

31. The optical recording material of claim 30 wherein said ethylenically unsaturated monomers have been thermally cured at between 20 and 80° C.

32. The optical recording material of claim 13 wherein the algebraic sum of the excitation energy of said recording sensitizer and its reduction potential is approximately equal to or larger than the oxidation potential of said isomerizable material whereby said recording sensitizer upon absorption of said actinic radiation will be capable of accepting an electron from said isomerizable material.

33. The optical recording material of claim 13 wherein said recording sensitizer is a cyanoaromatic compound, a pyridinium salt, a pyryllium salt, a thiopyryllium salt, a quinone, or a cyanine dye.

34. The optical recording material of claim 33 wherein said recording sensitizer is:

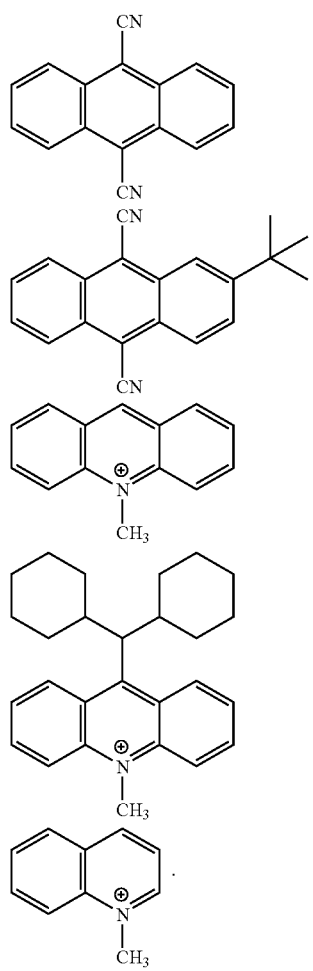

35. The optical recording material of claim 13 wherein said recording sensitizer upon absorption of actinic radiation reacts to produce a fragment radical cation, said fragment radical cation being capable of accepting an electron from said isomerizable material, whereby the oxidation potential of the neutral fragment is greater than that of said isomerizable material.

36. The optical recording material of claim 35 wherein said recording sensitizer is:

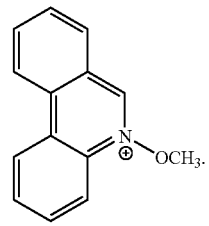

37. The optically recorded material of claim 13 wherein said matrix was polymerized by exposure to light of wavelength between 450 to 700 nanometers.

38. A method of forming an optically recorded article comprising providing a mixture of matrix precursor, recording sensitizer and isomerizable material, polymerizing said matrix precursor to form an optical cross linked recording article, and irradiating at least a portion of said optical recording article to form an image.

39. The method of claim 38 wherein said irradiating causes isomerization of said isomerizable material thereby creating regions of material with changed optical properties.

40. The method of claim 38 wherein said polymerizing of said matrix precursor is performed by heating.

41. The method of claim 38 wherein said polymerizing of said matrix precursor is performed by exposure to light of a wavelength different than the wavelength of light utilized for said irradiating.

42. The method of claim 38 wherein said light beam is a collimated laser beam.

43. The method of claim 41 wherein said matrix is polymerized by photochemical activation.

44. The method of claim 38 wherein said isomerizable material comprises the isomeric forms

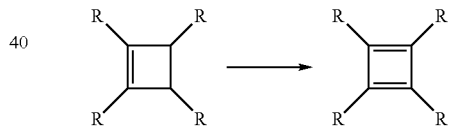

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

45. The method of claim 44 wherein said two isomeric forms comprise at least one of the following pairs:

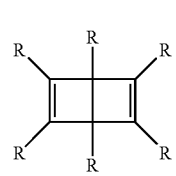 and 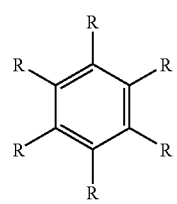

wherein R is
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

46. The method of claim 45 wherein the two isomeric forms comprise at least one of the following pairs:

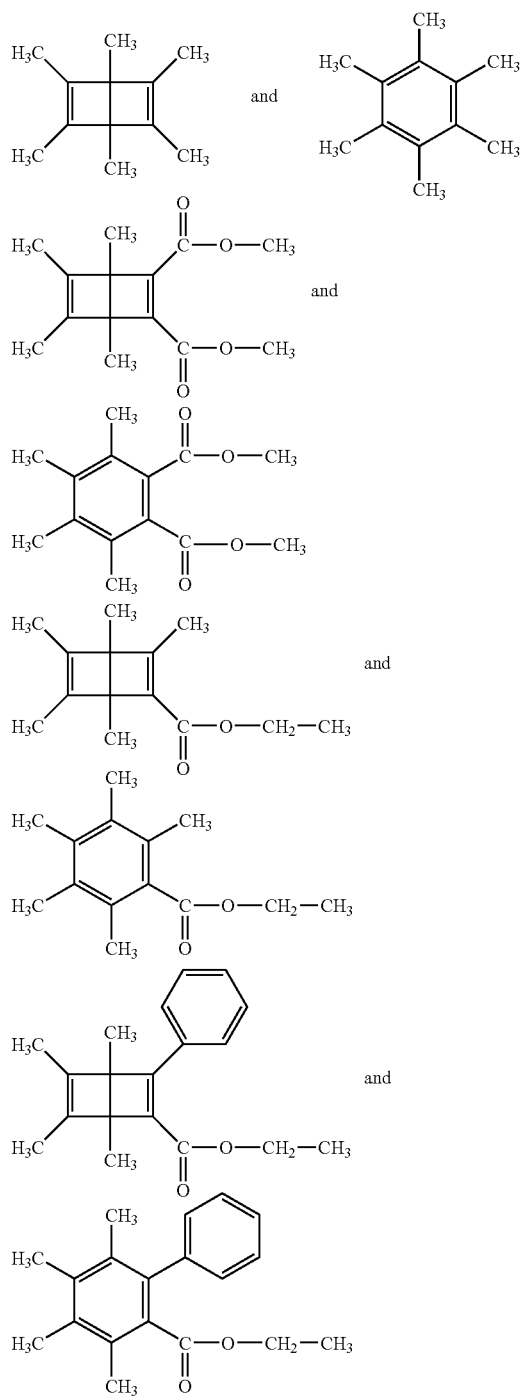

47. The method of claim 38 wherein said isomerizable material comprises the isomeric forms

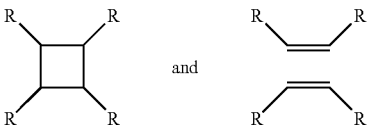

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

48. The method of claim 47 wherein said isomeric forms comprise least one of the following isomeric pairs

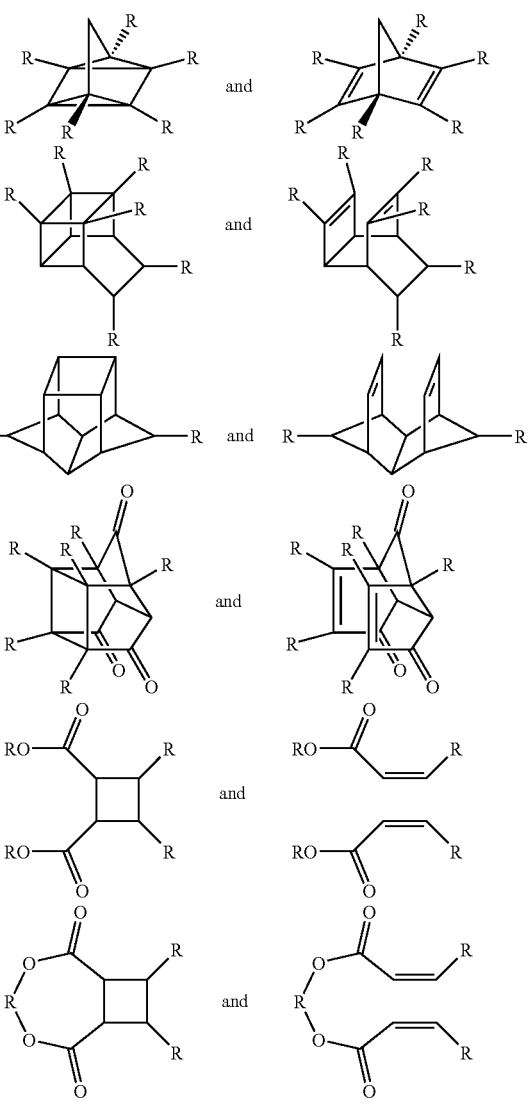

wherein
each R independently represents H, a substituted or unsubstituted alkyl or alkoxy group having from 1 to 12 carbon atoms, a cyano group, a carbonyl-containing group, a substituted or unsubstituted aryl group having from 6 to 18 carbon atoms, a substituted or unsubstituted heteroaromatic group, or two or more R groups can be joined together to form an additional ring system.

49. The method of claim 48 wherein said isomeric forms comprise at least one of the following isomeric pairs:

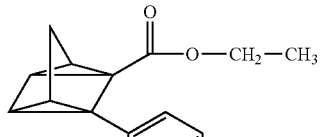
and
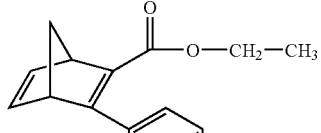

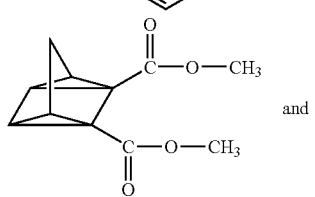
and
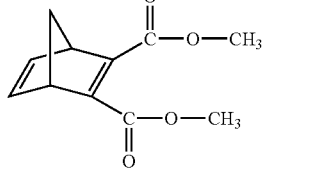

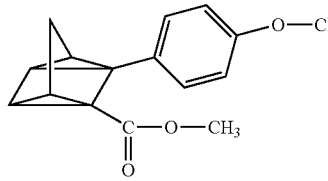
and
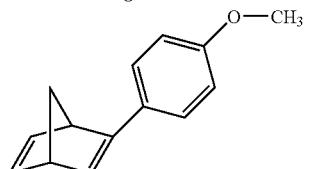

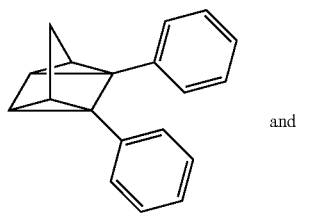
and

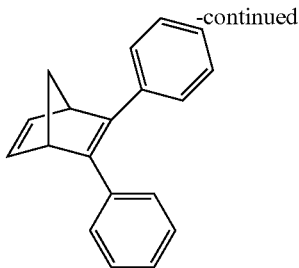

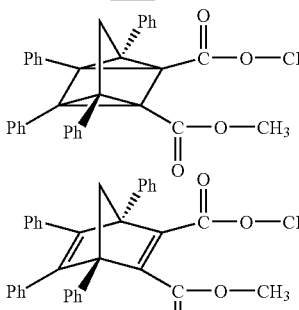
and

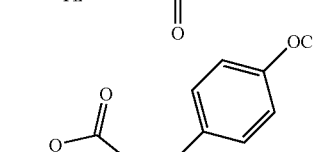

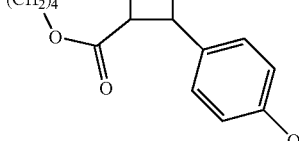
and

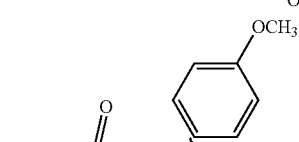

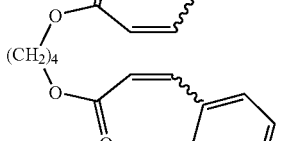
or

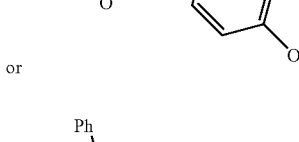

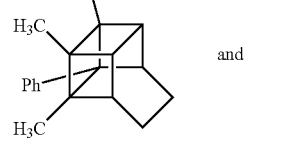 and 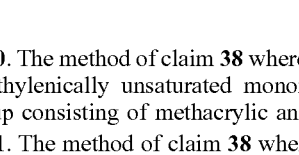 .

50. The method of claim 38 wherein said matrix precursor is ethylenically unsaturated monomers selected from the group consisting of methacrylic and acrylic esters.

51. The method of claim 38 wherein the polymerizing of the ethylenically unsaturated monomers is by thermally curing at temperatures less than 100° C.

52. The method of claim 38 wherein the polymerizing of the ethylenically unsaturated monomers is by thermally curing at temperatures between 20 and 80° C.

53. The method of claim 38 wherein said recording sensitizer comprises a cyanoaromatic compound, a pyridinium salt, a pyryllium salt, a thiopyryllium salt, or a quinone.

54. The method of claim 53 wherein said recording sensitizer is

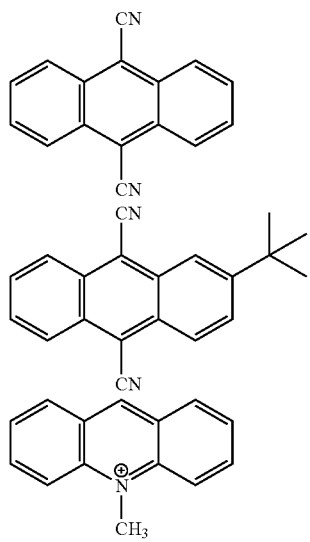

-continued

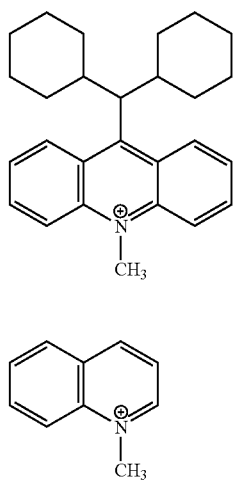

55. The method of claim 38 wherein isomerizing said reactant causes a change in refractive indexes.

56. The method of claim 38 wherein said matrix material is in-situ polymerized by optical exposure to light of a wavelength between 450 and 700 nanometers.

* * * * *